US012270303B2

(12) United States Patent
Swaminathan et al.

(10) Patent No.: US 12,270,303 B2
(45) Date of Patent: Apr. 8, 2025

(54) SEAL ASSEMBLY FOR A TURBOMACHINE

(71) Applicant: General Electric Company, Schenectady, NY (US)

(72) Inventors: Srinivasan Swaminathan, Bengaluru (IN); Anand Madihalli Srinivasan, Bengaluru (IN); Shalini Thimmegowda, Bengaluru (IN); Ravindra Shankar Ganiger, Bengaluru (IN)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 18/196,949

(22) Filed: May 12, 2023

(65) Prior Publication Data

US 2023/0383666 A1 Nov. 30, 2023

(30) Foreign Application Priority Data

May 26, 2022 (IN) ............................. 202211030221

(51) Int. Cl.
*F01D 11/00* (2006.01)
*F01D 25/18* (2006.01)

(52) U.S. Cl.
CPC .......... *F01D 11/001* (2013.01); *F01D 25/183* (2013.01); *F05D 2240/55* (2013.01); *F05D 2260/98* (2013.01); *F05D 2300/224* (2013.01)

(58) Field of Classification Search
CPC .... F01D 11/001; F01D 25/183; F01D 11/003; F01D 25/18; F05D 2240/55; F05D 2260/98; F05D 2300/224
USPC ....................................................... 415/170.1
See application file for complete search history.

(56) References Cited

U.S. PATENT DOCUMENTS

| | | | | |
|---|---|---|---|---|
| 2,347,953 | A | 5/1944 | Katcher | |
| 9,890,650 | B2 * | 2/2018 | Von Berg | F01D 11/003 |
| 10,385,921 | B2 | 8/2019 | Becker et al. | |
| 10,494,492 | B2 | 12/2019 | Ata et al. | |
| 10,781,709 | B2 | 9/2020 | Sen et al. | |
| 2015/0267816 | A1 | 9/2015 | Boskovski | |
| 2017/0074404 | A1 * | 3/2017 | Otschik | C04B 41/009 |
| 2020/0088055 | A1 | 3/2020 | Stoyanov et al. | |

FOREIGN PATENT DOCUMENTS

| | | |
|---|---|---|
| CN | 203939530 U | 11/2014 |
| EP | 3119732 | 4/2018 |
| EP | 3263842 | 9/2019 |

* cited by examiner

*Primary Examiner* — Yi-Kai Wang
(74) *Attorney, Agent, or Firm* — Klarquist Sparkman, LLP

(57) ABSTRACT

This disclosure is directed to seal assemblies for a turbomachine. The seal assemblies include stationary and rotating components and at least one interface between the stationary and rotating components. The seal assembly further includes a self-lubricating lattice element made of carbon or a carbon-based material. The self-lubricating lattice element may have a porous and compressible microstructure capable of retaining a liquid substance. During engine operation, the self-lubricating lattice element can compress and expel some portion of the liquid substance to form a liquid-containing layer between the rotating and stationary components of the seal assembly. Also described herein are self-lubricating wear sleeves for use in other portions of the turbomachine.

20 Claims, 11 Drawing Sheets

SEAL ASSEMBLY FOR A TURBOMACHINE

CROSS REFERENCE TO RELATED APPLICATION

This application claims the benefit of the India Provisional Patent Application No. 202211030221, filed on May 26, 2022, which is incorporated herein in its entirety.

FIELD

The present disclosure relates to turbomachine engine seals and self-lubricating interface materials for use with the turbomachine engine seals.

BACKGROUND

Turbomachines typically include a rotor assembly, a compressor, and a turbine. The rotor assembly may include a fan having an array of fan blades extending radially outwardly from a rotating shaft. The rotating shaft, which transfers power and rotary motion from the turbine to both the compressor and the rotor assembly, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a sump, or compartment, that holds a lubricant (for example, oil) for lubricating the bearing assembly. This lubricant may also lubricate gears and other seals. Gaps between the housing and the rotor shaft permit rotation of the rotor shaft relative to the housing. A bearing sealing system usually includes two such gaps: one on the upstream end and another on the downstream end. In this respect, a seal disposed in each gap prevents the lubricant from escaping the sump that holds the lubricant. Further, the air around the sump may generally be at a higher pressure than the sump to reduce the amount of lubricant that leaks from the sump. Further, the one or more gaps and corresponding seals are generally positioned upstream and/or downstream of the sump to create the higher-pressure region surrounding the sump.

Various components of the seals may rotate at high speeds during operation of the turbomachine engine, and others may remain stationary relative to the housing of the turbomachine. For example, the components on one side of a seal interface may rotate along with the rotating shaft of the turbomachine engine, and the components on the other side of the seal interface may remain stationary relative to the engine housing. The high relative speed between the components on opposite sides of the seal interface can generate high amounts of heat, friction, and component wear. The accumulation of heat and the wear of the components at the seal requires that the seal components be replaced periodically, and that the engine be routinely maintained.

Accordingly, there is a need for improved seal assemblies that reduce heat accumulation and wear at the seal interface.

DETAILED DESCRIPTION

Figure 1:
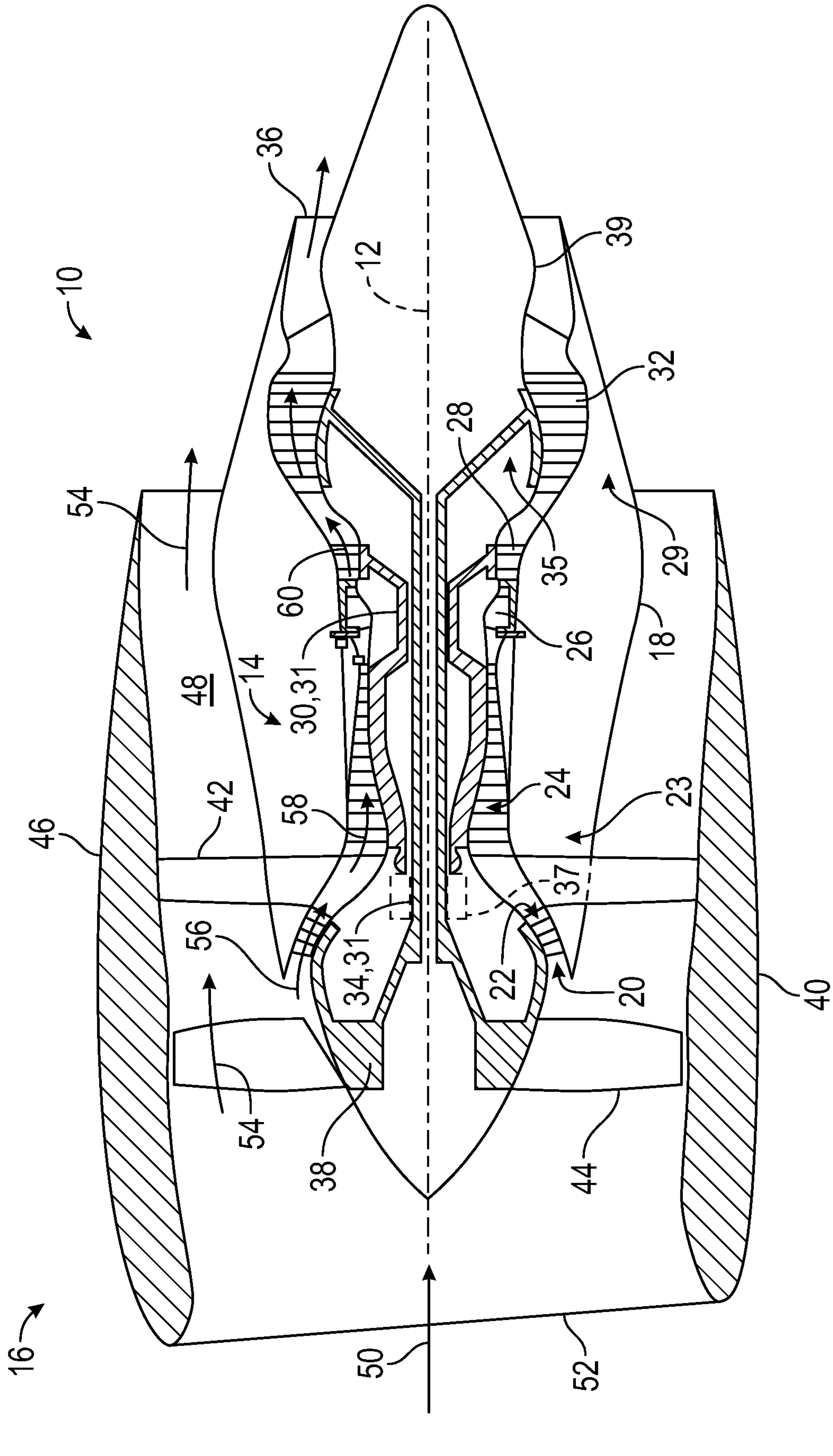
FIG. 1 illustrates a schematic side view of an example turbomachine engine.

Reference now will be made in detail to preferred embodiments, one or more examples of which are illustrated in the drawings. Each example is provided by way of explanation, not limitation of the preferred embodiments. In fact, it will be apparent to those skilled in the art that various modifications and variations can be made in the embodiments discussed without departing from the scope or spirit of disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms “first” and “second” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled,” “fixed,” “attached to,” and the like refer to both direct coupling, fixing, or attaching, as well as indirect coupling, fixing, or attaching through one or more intermediate components or features, unless otherwise specified herein.

The terms “communicate,” “communicating,” “communicative,” and the like refer to both direct communication as well as indirect communication such as through a memory system or another intermediary system.

The singular forms “a”, “an”, and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are examples of turbomachines and seal assemblies for use with turbomachines. The turbomachine may include a rotating shaft extending along a centerline axis and a fixed housing positioned exterior to the rotating shaft in a radial direction relative to the centerline axis. The seal assembly may include a sump housing at least partially defining a bearing compartment for holding a cooling lubricant. The seal assembly may further include a bearing supporting the rotating shaft. In addition, the seal assembly may also include a sump seal at least partially defining the bearing compartment. A pressurized housing of the seal assembly may be positioned exterior to the sump housing and define a pressurized compartment to at least partially enclose the sump housing. Further, a seal may be positioned between the rotating shaft and the pressurized housing to at least partially define the pressurized compartment to enclose the sump housing.

In certain examples, a seal assembly including a self-lubricating lattice material may allow for a more efficient turbomachine. A self-lubricating lattice material disposed between the rotating portions of a seal assembly and the static portions of the seal assembly can reduce the wear of the various seal assembly components that are in rotating contact with one another when the turbomachine is in an operational condition. Additionally, the use of a self-lubricating lattice material can mitigate heat buildup along the operational seal interface. In some examples, the self-lubricating lattice can be permeated with a lubricant and/or a coolant. For example, a self-lubricating lattice material can be deposited between a rotating runner and a static sealing element so as to form a lubricant layer between the runner and the sealing element when the turbomachine engine is operational.

It should be appreciated that, although the present subject matter will generally be described herein with reference to a gas turbine engine, the disclosed systems and methods may generally be used on bearings and/or seals within any suitable type of turbine engine, including aircraft-based turbine engines, land-based turbine engines, and/or steam turbine engines. Further, though the present subject matter is generally described in reference to a high-pressure spool of a turbine engine, it should also be appreciated that the disclosed system and method can be used on any spool within a turbine engine, for example, a low-pressure spool or an intermediate pressure spool.

Referring now to the drawings, FIG. 1 illustrates a cross-sectional view of one example of a turbomachine 10, also referred to herein as turbomachine engine 10. More particularly, FIG. 1 depicts the turbomachine 10 configured as a gas turbine engine that may be utilized within an aircraft in accordance with aspects of the present subject matter. The gas turbine engine is shown having a longitudinal or centerline axis 12, also referred to herein as a centerline, extending therethrough for reference purposes. In general, the engine may include a core engine 14 and a fan section 16 positioned upstream thereof. The core engine 14 may generally include a substantially tubular external housing 18 that defines an annular inlet 20. In addition, the external housing 18 may further enclose and support a compressor section 23. For the example show, the compressor section 23 includes a booster compressor 22 and a high-pressure compressor 24. The booster compressor 22 generally increases the pressure of the air (indicated by arrow 54) that enters the core engine 14 to a first pressure level. The high-pressure compressor 24, such as a multi-stage, axial-flow compressor, may then receive the pressurized air (indicated by arrow 58) from the booster compressor 22 and further increases the pressure of such air. The pressurized air exiting the high-pressure compressor 24 may then flow to a combustor 26 within which fuel is injected into the flow of pressurized air, with the resulting mixture being combusted within the combustor 26.

For the example illustrated, the external housing 18 may further enclose and support a turbine section 29. Further, for the depicted example, the turbine section 29 includes a first, high-pressure turbine 28 and second, low-pressure turbine 32. For the illustrated examples, one or more of the compressors 22, 24 may be drivingly coupled to one or more of the turbines 28, 32 via a rotating shaft 31 extending along the centerline axis 12. For example, high energy combustion products 60 are directed from the combustor 26 along the hot gas path of the engine to the high-pressure turbine 28 for driving the high-pressure compressor 24 via a first, high-pressure drive shaft 30. Subsequently, the combustion products 60 may be directed to the low-pressure turbine 32 for driving the booster compressor 22 and fan section 16 via a second, low-pressure drive shaft 34 generally coaxial with high-pressure drive shaft 30. After driving each of turbines 28 and 32, the combustion products 60 may be expelled from the core engine 14 via an exhaust nozzle 36 to provide propulsive jet thrust. Further, the rotating shaft(s) 31 may be enclosed by a fixed housing 39 extending along the centerline axis 12 and positioned exterior to the rotating shaft 31 in a radial direction relative to the centerline axis 12.

Additionally, as shown in FIG. 1, the fan section 16 of the engine may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several examples, the low-pressure drive shaft 34 may be directly coupled to the fan rotor assembly 38 to provide a direct-drive configuration. Alternatively, the low-pressure drive shaft 34 may be coupled to the fan rotor assembly 38 via a speed reduction device 37 (for example, a reduction gear or gearbox or a transmission) to provide an indirect-drive or geared drive configuration. Such a speed reduction device(s) 37 may also be provided between any other suitable shafts and/or spools within the turbomachine engine 10 as desired or required.

During operation of the turbomachine engine 10, it should be appreciated that an initial airflow (indicated in FIG. 1 by arrow 50) may enter the turbomachine engine 10 through an associated inlet 52 of the fan casing 40. For the illustrated example, the airflow then passes through the fan blades 44 and splits into a first compressed airflow (indicated by arrow 54) that moves through the by-pass airflow conduit 48 and a second compressed airflow (indicated by arrow 56) which enters the booster compressor 22. In the depicted example, the pressure of the second compressed airflow 56 is then increased and enters the high-pressure compressor 24 (as indicated by arrow 58). After mixing with fuel and being combusted within the combustor 26, the combustion products 60 may exit the combustor 26 and flow through the high-pressure turbine 28. Thereafter, for the shown example, the combustion products 60 flow through the low-pressure turbine 32 and exit the exhaust nozzle 36 to provide thrust for the engine.

Figure 2:
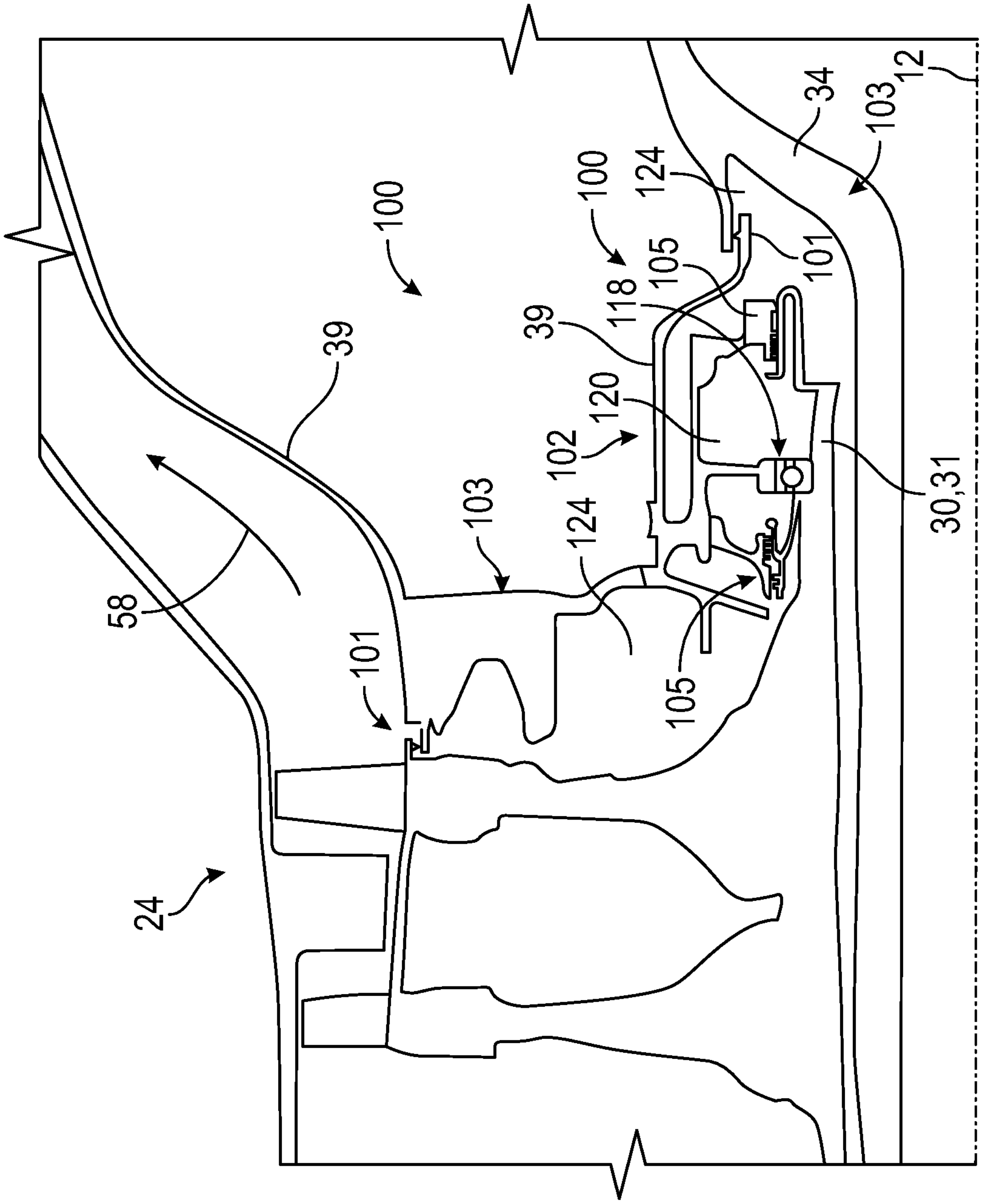
FIG. 2 illustrates a schematic side view of a section of a turbomachine engine including an example of a seal assembly.

Turning now to FIG. 2, the turbomachine engine 10 can include a seal assembly 100, positioned between stationary and rotating components of the turbomachine engine. For example, the seal assembly 100 can be positioned between the stationary and rotating components of the high-pressure compressor 24 described above.

The seal assembly 100 may generally isolate a sump housing 102 from the rest of the turbomachine engine 10. As such, the seal assembly 100 includes the sump housing 102. The sump housing 102 includes at least a portion of the rotating shaft 31 and the fixed housing 39. For example, the fixed housing 39 may include various intermediary components or parts extending from the fixed housing 39 to form a portion of the sump housing 102. Such intermediary components parts may be coupled to the fixed housing 39 or formed integrally with the fixed housing 39. Similarly, the rotating shaft 31 may also include various intermediary components extending from the rotating shaft 31 to form the sump housing. Further, the sump housing 102 at least partially defines a bearing compartment 120 for holding a cooling lubricant (not shown). For instance, the sump housing 102 at least partially radially encloses the cooling lubricant and a bearing 118 (as described in more detail in relation to FIG. 3A). The cooling lubricant (for example, oil) for lubricating the various components of the bearing 118 may circulate through the bearing compartment 120. The seal assembly 100 may include one or more sump seals 105 (as described in more detail in reference to FIGS. 3 and 4) at least partially defining the bearing compartment 120 for holding the cooling lubricant.

The seal assembly 100 further includes a pressurized housing 103 positioned exterior to the sump housing 102. The pressurized housing 103 may at least partially enclose the sump housing 102. For example, as illustrated, the pressurized housing 103 may be positioned both forward and aft relative to the centerline axis 12 of the turbomachine engine 10. The pressurized housing 103 may include at least a portion of the rotating shaft 31 and the fixed housing 39 or intermediary components extending from the rotating shaft 31 and/or the fixed housing 39. For example, the pressurized housing 103 may be formed at least partially by the high-pressure drive shaft 30 and the fixed housing 39 both forward and aft of the sump housing 102.

For the depicted example, the pressurized housing 103 defines a pressurized compartment 124 to at least partially enclose the sump housing 102. In the exemplary example, bleed air from the compressor section 23 (FIG. 1), the turbine section 29 (FIG. 1), and/or the fan section 16 (FIG. 1) may pressurize the pressurized compartment 124 to a pressure relatively greater than the pressure of the bearing compartment 120. As such, the pressurized compartment 124 may prevent or reduce the amount of any cooling lubricant leaking from the sump housing 102 across the sump seal(s) 105.

Further, the seal assembly 100 may include one or more seals to further partially define the pressurized compartment 124 (such as the seal assemblies 200, 400, 500, and 600 as described in more detail in regards to FIGS. 4-11). For instance, one or more sealing elements may be positioned between the rotating shaft 31 and the fixed housing 39.

Figure 3A:
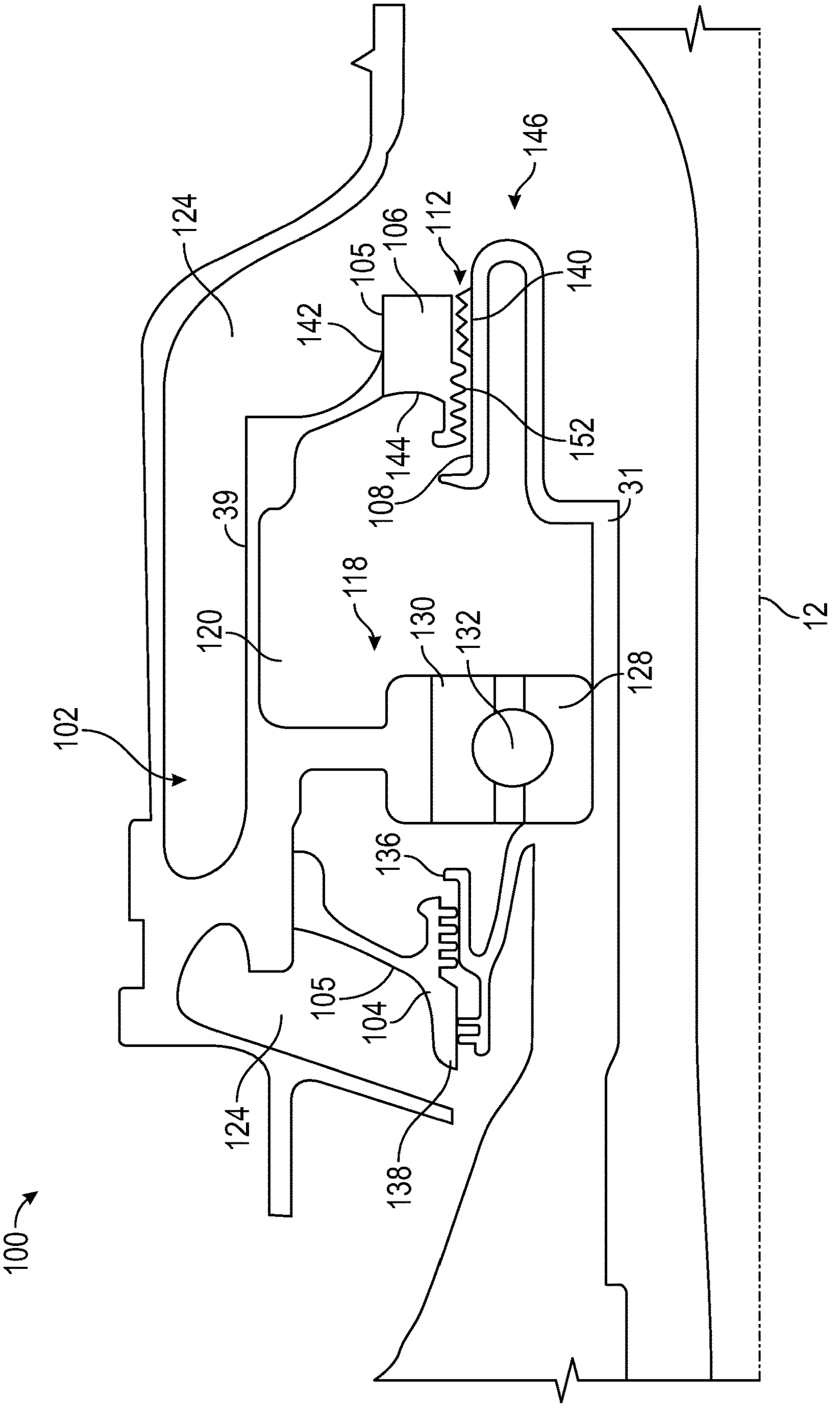
FIG. 3A illustrates an enlarged view of the non-contacting seal assembly depicted in FIG. 2.

Referring now to FIG. 3A, a closer view of the sump housing 102 is illustrated according to aspects of the present disclosure. In the illustrated example, the seal assembly 100 includes the bearing 118. The bearing 118 may be in contact with an exterior surface of the rotating shaft 31 and an interior surface of the fixed housing 39. It should be recognized that the rotating shaft 31 may be the high-pressure drive shaft 30 or the low-pressure drive shaft 34 described in regards to FIG. 1 or any other rotating drive shaft of the turbomachine 10. The bearing 118 may be positioned radially between the portion of the rotating shaft 31 and the portion of the fixed housing 39 that form the sump housing 102. As such, the bearing 118 may be positioned within the sump housing 102. The bearing 118 may support the rotating shaft 31 relative to various fixed components in the engine.

In the depicted example, the bearing 118 may be a thrust bearing. That is, the bearing 118 may support the rotating shaft 31 from loads in the axial, or the axial and radial directions relative to the centerline axis 12. For example, the bearing 118 may include an inner race 128 extending circumferentially around an outer surface of the rotating shaft 31. In the shown example, an outer race 130 is disposed radially outward from the inner race 128 and mates with the fixed housing 39, such as an interior surface of the sump housing 102. The inner and outer races 128, 130 may have a split race configuration. For the depicted example, the inner and outer race 128, 130 may sandwich at least one ball bearing 132 therebetween. Preferably, the inner and outer races 128, 130 sandwich at least three ball bearings 132 therebetween.

In additional examples, the bearing 118 may be a radial bearing. That is, the bearing 118 may support the rotating shaft 31 from loads generally in the radial direction relative to the centerline axis 12. In other examples, the inner race 128 and outer race 130 may sandwich at least one cylinder, cone, or other shaped element to form the bearing 118.

Still referring to FIG. 3A, the seal assembly may include two sump seals 105. Each of a first and second sump seals 105 may be positioned between the rotating shaft 31 and the fixed housing 39 to at least partially define the bearing compartment 120 for housing the cooling lubricant and the bearing 118. For example, the first sump seal 105 may be positioned forward of the bearing 118, and the second sump seal 105 may be positioned aft of the bearing 118. For the illustrated example, the first sump seal 105 may be a labyrinth seal 104, and the second sump seal 105 may be a carbon seal 106. Although, the two sump seals 105 may be any suitable type of seal, and, in other examples, the sealing system may include further sump seals 105, such as three or more. For example, in other examples, multiple labyrinth seals, carbon seals, and/or hydrodynamic seals may be utilized in the sump housing 102 in any arrangement.

FIG. 3A also more closely illustrates the labyrinth seal 104 and the carbon seal 106. For the example depicted, the labyrinth seal 104 and the carbon seal 106 (such as a hydrodynamic seal) are non-contact seals, which do not require contact between the stationary and moving components when operating at high speed. Non-contact seals typically have a longer service life than contact seals. Still, in other examples, one or both of the sump seals 105 may be contact seal. Each type of seal may operate in a different manner. For the depicted example, the labyrinth seal 104 includes an inner surface 136 (coupled to the rotating shaft 31) and an outer surface 138 (coupled to the fixed housing 39). For example, a tortuous path (not shown) extending between the inner and outer surfaces 136, 138 prevents the cooling lubricant from escaping the sump housing 102. For the exemplary example shown, the air pressure on an outer side of the labyrinth seal 104 (that is, in the pressurized compartment 124) is greater than the air pressure on the inner side of the labyrinth seal 104 (that is, in the bearing compartment 120). In this respect, the stationary and rotating components may be separated by an air film (sometimes called an air gap) during relative rotation therebetween.

The carbon seal 106 may, in some examples, be a hydrodynamic or non-contacting seal with one or more grooves 140 that positioned between the stationary and rotating components, as illustrated in FIG. 3A. In general, the hydrodynamic grooves may act as pump to create an air film between the non-contacting carbon seal 106 and the rotating shaft 31. For example, as the rotating shaft 31 rotates, fluid shear may direct air in the radial gap 112 into the hydrodynamic groove(s). As air is directed into the hydrodynamic grooves, the air may be compressed until it exits the hydrodynamic groove(s) and forms the air film to separate the rotating shaft 31 and the non-contacting carbon seal 106. The air film may define a radial gap 112 between the stationary and non-stationary components of the seal assembly 100, as shown in FIG. 3A. Thus, the rotating shaft 31 may ride on the air film instead of contacting the inner sealing surface 108.

In some examples, the carbon seal 106 is proximate to and in sealing engagement with a hairpin member 146 of the rotating shaft 31. In this respect, the hairpin member 146 may contact the carbon seal 106 when the rotating shaft 31 is stationary or rotating at low speeds. Though it should be recognized that the carbon seal 106 may be in sealing engagement with any other part or component of the rotating shaft 31. Nevertheless, for the illustrated hydrodynamic, carbon seal 106, the carbon seal 106 lifts off of the rotating shaft 31 and/or the hairpin member 146 when the rotating shaft 31 rotates at sufficient speeds.

Figure 3B:
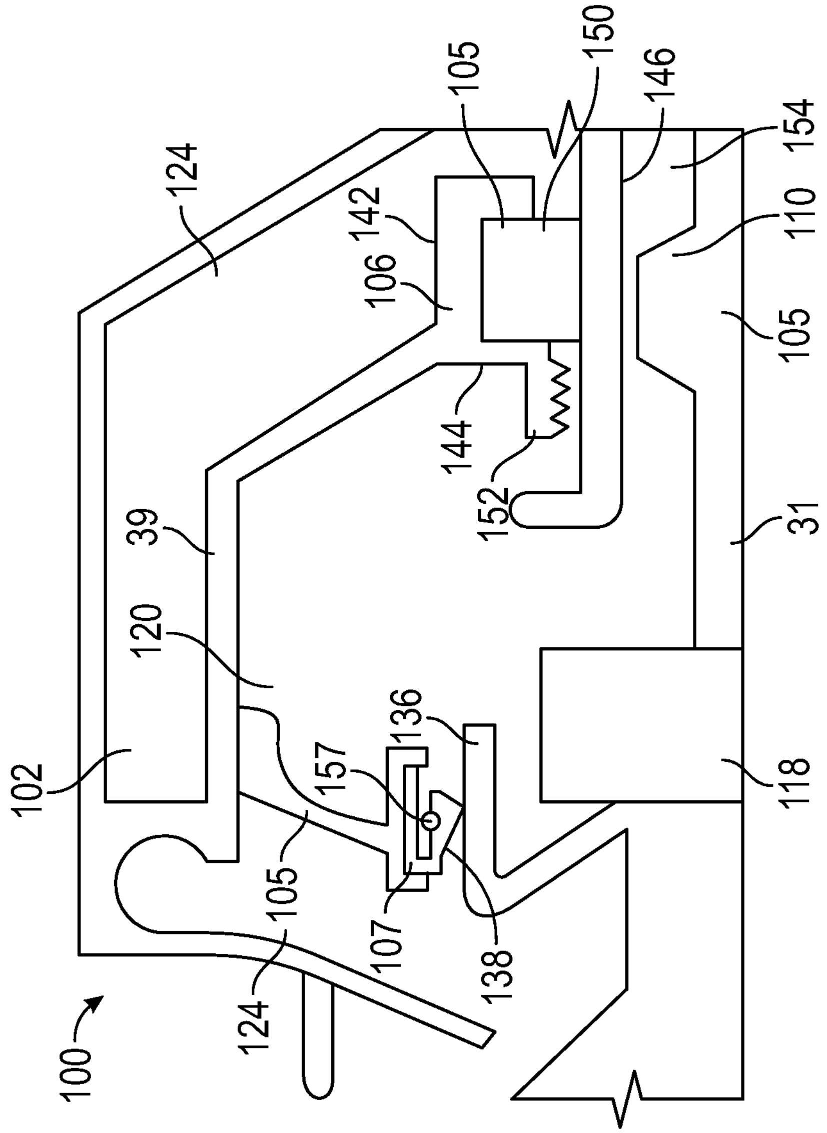
FIG. 3B illustrates a schematic side view of a section of a turbomachine engine including a contact seal assembly.

Referring now to FIG. 3B, a sump housing 102 of a seal assembly 100 is illustrated according to another aspect of the present disclosure. It should be noted that the description of the seal assembly 100 of FIG. 3A applies to like parts of the seal assembly 100 of FIG. 3B unless otherwise noted, and accordingly like parts will be identified with like numerals.

The sump housing 102 of FIG. 3B particularly illustrates the sump housing 102 with three sump seals 105. The sump housing 102 may generally be configured as the sump housing 102 of FIG. 3A. For example, the sump housing 102 may include a portion of the rotating shaft 31, a portion of the fixed housing 39, and enclose the bearing 118. Further, the sump seals 105 and the sump housing 102 at least partially define the bearing compartment 120.

In the example illustrated, one of the sump seals 105 is a contacting lip seal 107. As such, the inner surface 136 and the outer surface 138 may be in contact in order to seal the sump housing 102. Further, a spring 157 may be in compression between the outer surface 138 and the fixed housing 39 to maintain contact between the inner and outer surfaces 136, 138. The illustrated example further includes a carbon seal 106 configured as a contacting carbon seal. As such, the carbon seal 106 includes a carbon element 150 in sealing engagement with the rotating shaft 31. For the example depicted, the carbon element 150 may engage the hairpin member 146 of the rotating shaft 31. Additionally, the carbon seal 106 may include a windback 152 that reduces the amount of the cooling lubricant that reaches the carbon element 150. Further, one of the sump seals 105 may be an open gap seal 110. For instance, the pressure on an outer side 154 (such as the pressurized compartment 124) may be greater than the pressure of the bearing compartment 120 and thus reduce the leakage of cooling lubricant through the open gap seal 110. In further examples, one of the sump seals 105 may be a brush seal. In such examples, the brush seal may contain a plurality of bristles (such as carbon bristles) in sealing engagement between the rotating shaft 31 and the fixed housing 39.

Because components of the seal assembly may rotate at high speeds relative to one another during the operation of the turbomachine engine, heat generation and mechanical wear can arise. Generated heat must be dissipated to support engine operation and to avoid burning off lubricants during engine operation, as well as to prevent thermal expansion of engine components. This challenge may be addressed by reducing the amount of heat generated during the operation of the engine, in turn reducing the amount of heat that must be dissipated. Additionally, wear of the engine components can cause a decrease in operational performance over time and minimizing the wear of the engine components can increase the time an engine may operate before needing repair and maintenance. Both problems may be addressed by adding coolants and lubricants to the rotational interface of the seal components and/or selecting low friction materials for those portions of the engine rotating at high speeds relative to one another. However, it may be difficult to ensure that the lubricant remains in the rotational interface between the seal components. Furthermore, improved conformity between the components of the seal assembly rotating at high speeds relative to one another may reduce wear and heat generation. Seal assemblies and components for seal assemblies to address these needs are discussed in greater detail below.

Another example seal assembly 200 that may be used with the turbomachine engine discussed above is illustrated in FIGS. 4 through 6. It should be noted that the description of the seal assembly 100 of FIGS. 2, 3A and 3B applies to like parts of the seal assembly 200 of FIGS. 4 through 6 unless otherwise noted, and accordingly like parts will be identified with like numerals.

Figure 4:
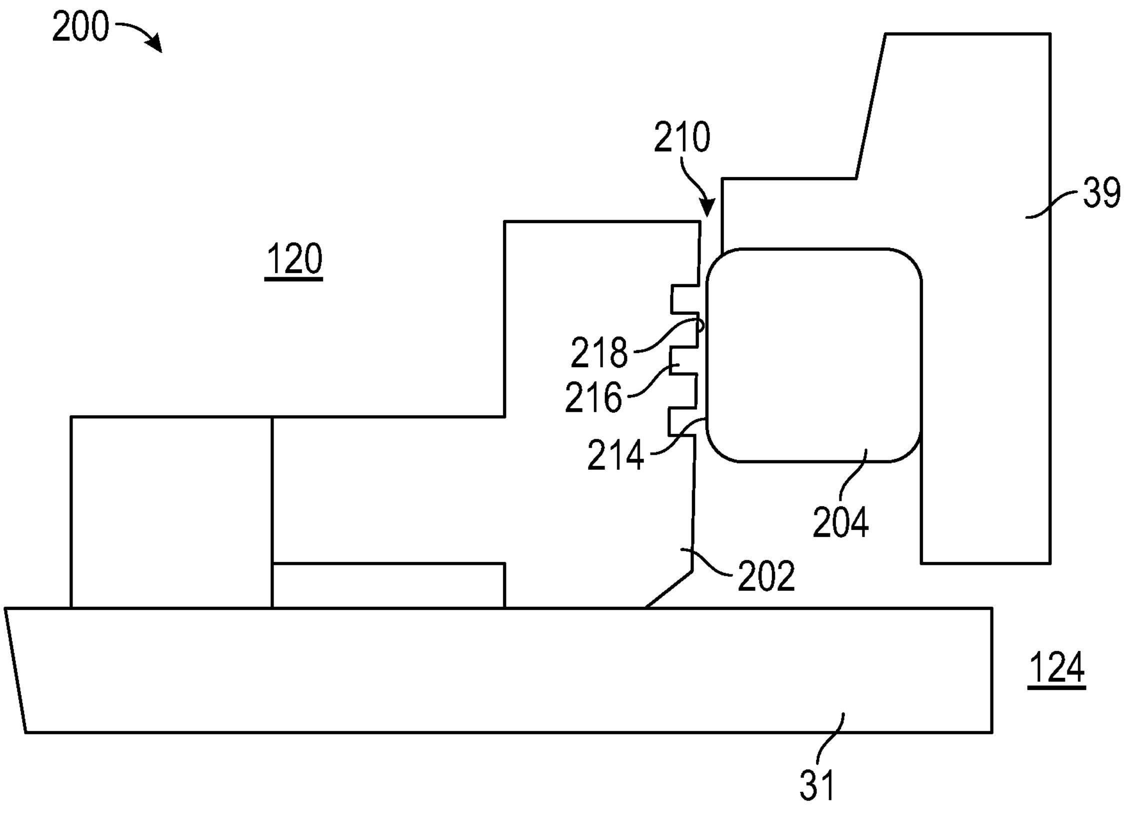
FIG. 4 illustrates a schematic of a seal assembly according to another example.

The seal assembly 200, as illustrated in FIG. 4, can be positioned between the components of the rotating shaft 31 and the components of the fixed housing 39 and can comprise a runner 202 disposed circumferentially around the rotating shaft 31 and a sealing element 204 statically coupled to the fixed housing 39.

During the operation of a turbomachine engine 10 that includes the seal assembly 200, the rotation of the rotating shaft 31 causes the corresponding rotation of the runner 202 connected to the rotating shaft 31. The runner 202 rotates relative to the sealing element 204 along an interface 210. The interface 210 can, in some examples, form a boundary between two chambers, such as the bearing compartment 120 and the pressurized compartment 124 described above, and accordingly the interface 210 can, in some examples, prevent the flow of fluids between the two chambers.

In some examples, such as that illustrated in FIG. 4 the seal assembly 200 can be a hydrodynamic seal. In such examples, the sealing element 204 and/or the runner 202 can have hydrodynamic features such as hydrodynamic grooves 216. The hydrodynamic grooves 216 function in substantially the same way as the hydrodynamic grooves in non-contacting hydrodynamic seal 101 described above to create an air cushion along the interface 210 between the runner 202 and the sealing element 204. As the rotating shaft 31 and the connected runner 202 rotate relative to the sealing element 204 and the fixed housing 39, the air cushion prevents the sealing element 204 and the runner 202 from coming into contact, while preventing the flow of fluids such as coolant between the two chambers separated by the seal, such as the bearing compartment 120 and the pressurized compartment 124. While FIG. 4 shows a runner having hydrodynamic grooves 216, it is to be understood that in other examples, such as those described below, the seal assembly 200 can include a contacting seal rather than a non-contracting hydrodynamic seal, and in such examples, the hydrodynamic grooves 216 may be omitted.

In other examples, the seal assembly 200 can be a contact seal, such as those discussed above. In such examples, the interface 210 is formed by the contact between a first surface 212 (FIG. 5) of the runner 202 and a second surface 214 of the sealing element 204. When the turbomachine engine 10 including the seal assembly 200 is in an operational condition, the first surface 212 of the runner 202 can rotate against the second face of the sealing element 204. The friction of the dynamic contact between the first and second surfaces 212, 214 can cause the second surface 214 of the sealing element 204 to wear and/or abrade until it conforms to the surface features of the first surface 212 of the runner 202.

Due to the high relative rotational speed between the runner 202 and the sealing element 204 along the interface 210, it may be advantageous, particularly in examples of seal assembly 200 that includes a contacting seal, to select materials for the runner 202 and the sealing element 204 that both have high thermal conductivity and which form a low coefficient of dynamic friction along the interface 210. For instance, in one particular example, the runner 202 can be formed of steel or other hard, non-deforming material, and the sealing element 204 can be formed from carbon. However, it is to be understood that other materials with high thermal conductivity and low coefficient of friction against the material of the runner 202 can be used for the sealing element 204.

Figure 5:
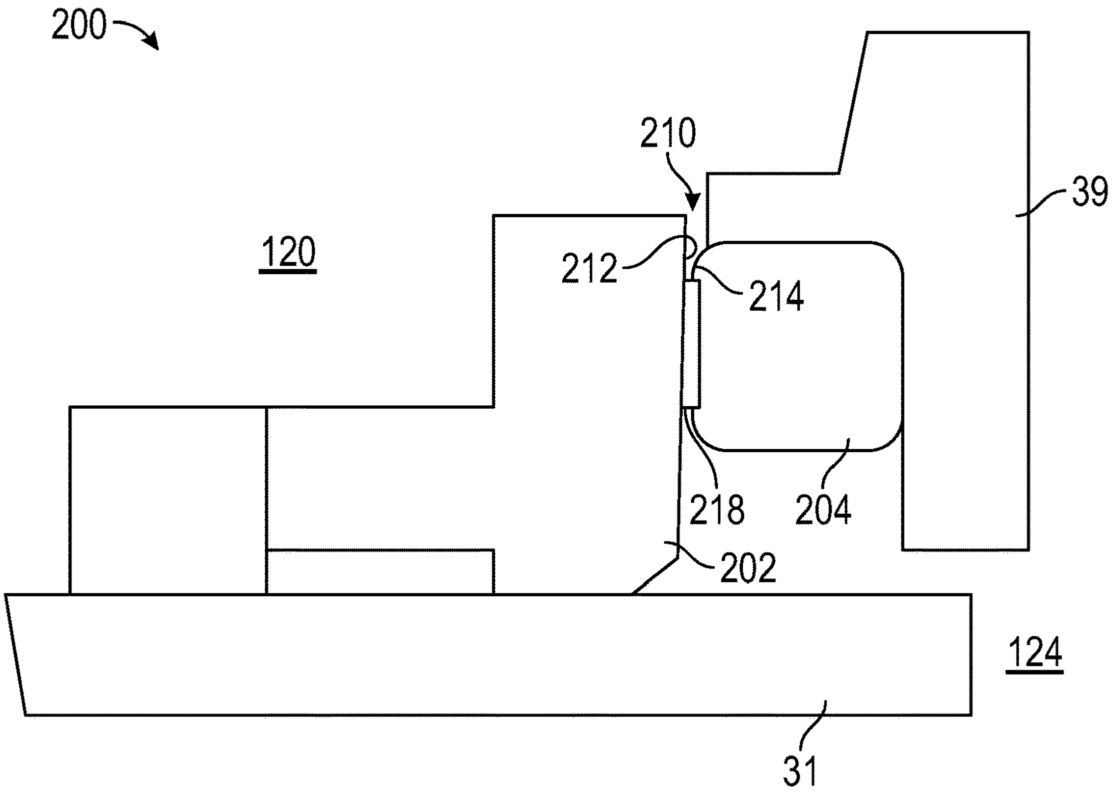
FIG. 5 illustrates a schematic of the seal assembly of FIG. 4 including a self-lubricating pad according to one example.

In other examples, such as that illustrated in FIG. 5, the seal assembly can include an interfacial layer 218 disposed between the sealing element 204 and the runner 202. In some such examples, the interfacial layer 218 can be disposed on the second surface 214 of the sealing element 204 and be stationary relative to the sealing element 204. In such examples, the interface 210 exists between the interfacial layer 218 and first surface 212 of the runner 202, as indicated in FIG. 5. In other examples, however, the interfacial layer 218 can be disposed on the first surface 212 of the runner 202 and be stationary relative to the runner. In such examples, the interface 210 exists between the interfacial layer 218 and the second surface 214 of the sealing element 204.

Figure 6:
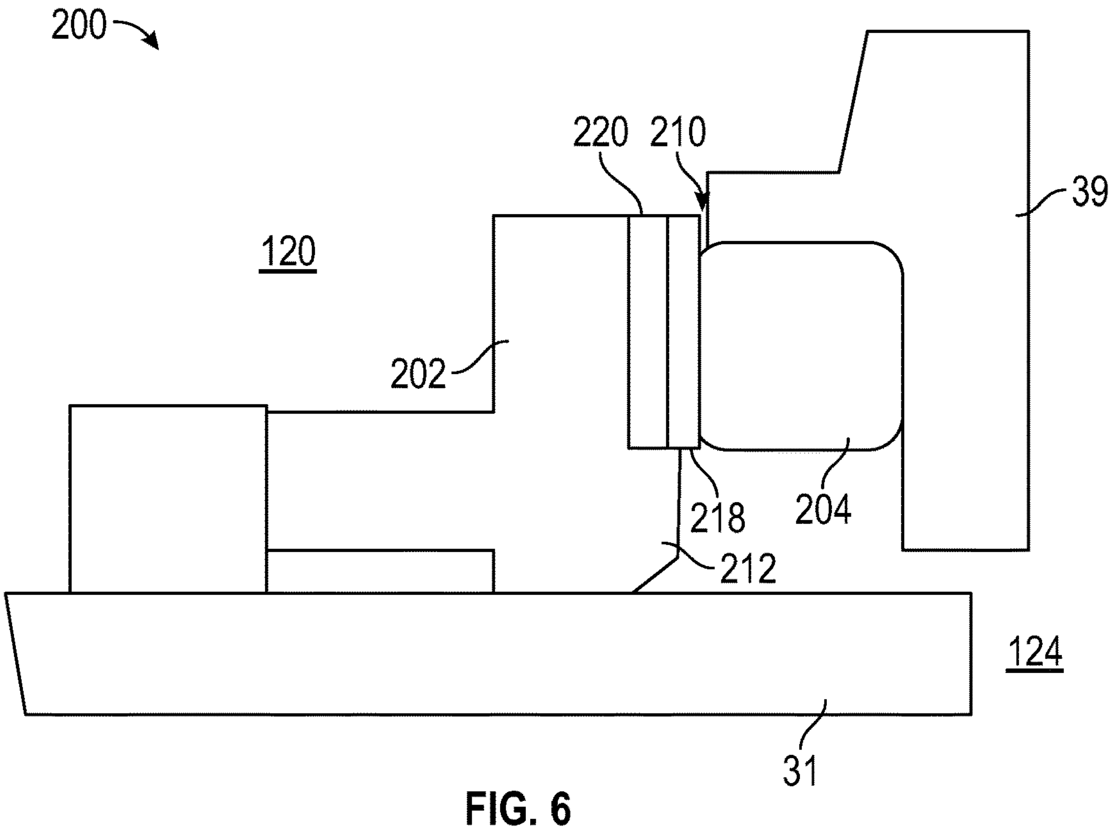
FIG. 6 illustrate a schematic of the seal assembly of FIG. 4 including a self-lubricating pad on an insert according to one example.

In some examples, such as that depicted in FIG. 6, the interfacial layer 218 can be disposed on a detachable insert 220. In some such examples, the detachable insert 220 can be positioned in a corresponding slot or groove 222 in the runner 202, such that the interfacial layer 218 is disposed between the insert 220 and the sealing element 204. Advantageously, in such configurations, should the interfacial layer 218 become damaged, the interfacial layer 218 and the detachable insert 220 can be replaced together by removing the detachable insert 220 and installing a new detachable insert 220 in the groove 222. It should be understood that, while FIG. 6 shows a seal assembly 200 having a detachable insert 220 disposed within a corresponding notch or groove 222 in the runner 202, the insert may also be disposed within a notch or groove 222 in the sealing element 204, with the interfacial layer in contact with the first surface 212 (FIG. 5) of the runner 202.

While the examples described above include only a single interfacial layer 218 disposed between the runner 202 and the sealing element 204, it is to be understood that in other examples, two interfacial layers 218 may be used, with a first interfacial layer 218 disposed on the runner 202, and a second interfacial layer 218 disposed on the sealing element 204. In such examples, the first interfacial layer 218 disposed on the runner 202 will rotate relative to the interfacial layer 218 disposed on the sealing element 204, and in tandem with the runner 202 and the rotating shaft 31. In these examples, the interface 210 is formed by the area of contact between the first and second interfacial layers 218. Advantageously, such examples allow the contacting between the different components of the seal assembly that rotate relative to each other to take place solely along the area of mutual contact between the interfacial layers 218, which may be selected from materials with a low tendency to cause wear damage, or from those particularly suited for dissipating heat flow from the interface 210.

Also disclosed herein are examples of compressible interfacial materials, suitable for use in the interfacial layers of the seal assemblies discussed above, such as interfacial layer 218 of seal assembly 200 (FIG. 5). Such example carbon seal elements may be used either with contacting or non-contacting seals, previously discussed, and may be designed to be in moving contact with either the runner or the sealing elements. While the use of such interfacial materials is discussed below with respect to their use in seal assembly 200, it is to be appreciated that these materials may be used in any other contacting or non-contacting seal in a turbomachine engine, such as turbomachine engine 10.

Figure 7A:
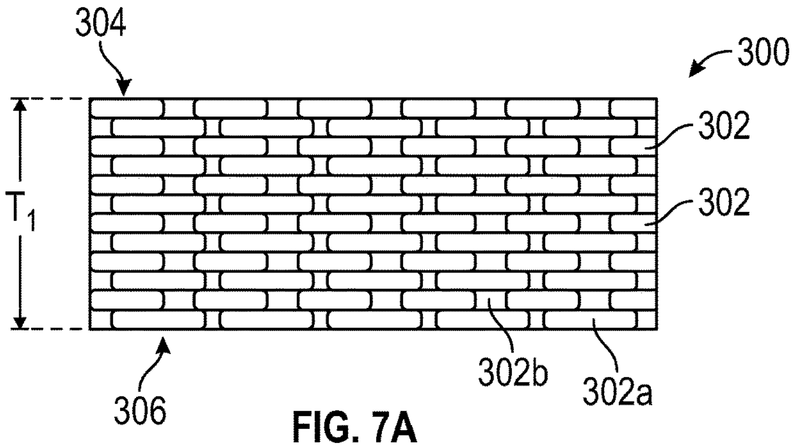
FIG. 7A illustrates a self-lubricating pad according to one example.

FIGS. 7A through 7D depicts a self-lubricating lattice element 300 suitable for use in the seal assembly 200 described above. In certain examples, the self-lubricating lattice element 300 can be a compressible self-lubricating lattice element, formed of carbon-based materials. The self-lubricating lattice element 300 can comprise a plurality of individual carbon layers 302, and can have a first end 304, a second end 306, and an initial thickness T1 defined by the distance between the first end 304 and the second end 306 when the self-lubricating lattice element 300 is in an uncompressed state. As illustrated in FIG. 7A, the individual carbon layers 302 can be arranged with differing orientations, with some carbon layers 302*a* oriented in a first direction, and other carbon layers 302*b* oriented in a second direction perpendicular to the first direction. It is to be understood, however, that the layers may be arranged with different relative orientations in other examples. The carbon layers 302 can be stacked or assembled to produce a self-lubricating lattice element 300 of varying thicknesses, depending on the desired application. For example, while FIG. 7A shows a self-lubricating lattice element 300 with 12 carbon layers 302, in other examples, the self-lubricating lattice element 300 can include a greater or lesser number of layers, such as 1, 2, 3, 4, 5, 6, 7, 8, 9, 10, 11, 13, 14, 15, 16, 17, 18, 19, 20, 21, 22, 23, or 24 layers.

The carbon layers 302 can comprise porous carbon-based or carbon-containing materials, such as graphite, graphene or a combination thereof, and can be manufactured by an additive manufacturing or three-dimensional printing process. In some examples, the carbon layers 302 can be separately printed and subsequently assembled or woven into the self-lubricating lattice element 300. In alternative examples, the self-lubricating lattice element 300 can be printed as a unitary structure, with each subsequent layer printed or manufactured atop the previous layers. In yet other examples, the self-lubricating lattice element 300 can be grown by various chemical or physical vapor deposition process. In some examples, the self-lubricating lattice element 300 can be formed separately from the other components of the seal assembly 200, and later coupled to either the runner 202 or the sealing element 204. However, it is to be appreciated that the self-lubricating lattice element 300 can be printed or grown directly on the surface of either the runner 202 or the sealing element 204.

Figure 7B:
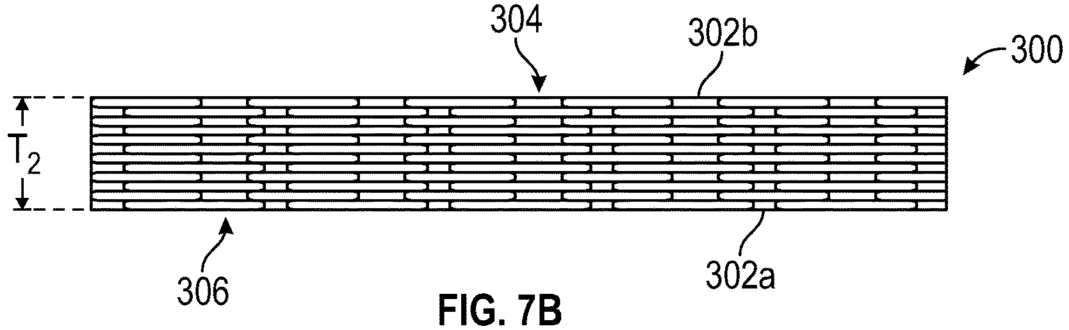
FIG. 7B illustrates the self-lubricating pad of FIG. 7A in a compressed condition.
Figure 7C:
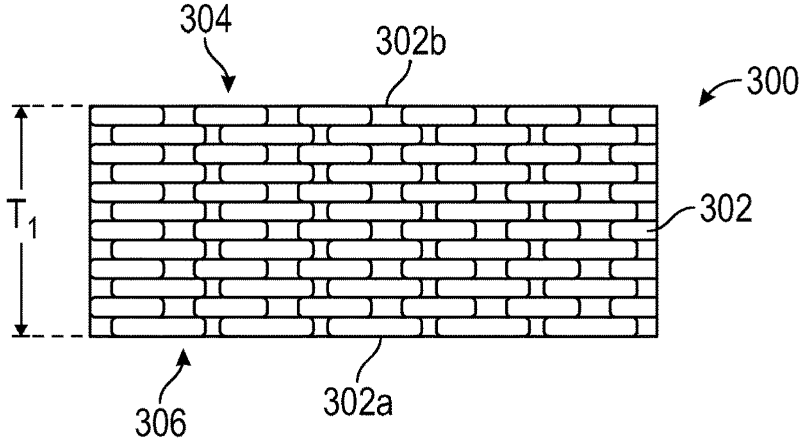
FIG. 7C illustrates the self-lubricating pad of FIG. 7B after elastically returning to a non-compressed condition.
Figure 7D:
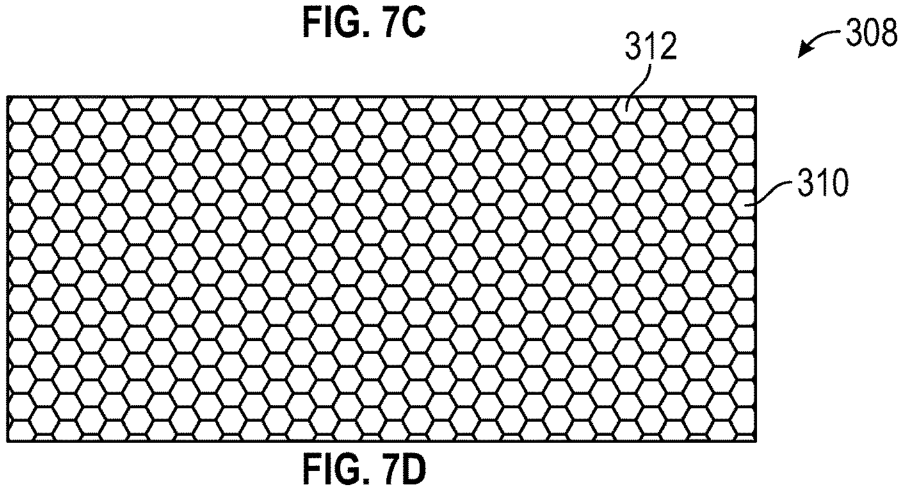
FIG. 7D illustrates the porous structure of the self-lubricating pad of FIGS. 7A-7C.

The carbon-based material of the individual carbon layers 302 can have a porous microstructure 308, illustrated in FIG. 7D. The porous microstructure can comprise solid material 310 and pores 312. This porous microstructure 308 enables the individual carbon layers 302 (FIG. 7A) to be able to retain oil or other fluids, and to deform under compressive stresses, as discussed in greater detail below.

The porous microstructure 308 of the carbon-based material of the self-lubricating lattice element 300 can, in some examples, enable the material to absorb and retain a fluid, such as coolant or lubricant oil. When the self-lubricating lattice element 300 is subjected to a compressive force and moved from an uncompressed state to a compressed state, the pores 312 can shrink or close, expelling or partially expelling the fluid retained therein. When the self-lubricating lattice element 300 is released from the compressive force and returns from the compressed configuration to the uncompressed state, the pores 312 can re-expand and take up some or all of the fluid previously expelled through capillary action.

As discussed above, self-lubricating lattice element 300 can be fabricated from carbon or carbon containing materials such as graphite or graphene, or a combination thereof. These materials, as well as the cooling fluids and/or lubricants that can be retained in the pores 312 of the carbon pad material can, in some cases, be selected for high thermal conductivity. This allows for a more rapid flow of heat away from heat generating interfaces, such as the interface 210 between the runner 202 and the sealing element 204 (See FIGS. 4 through 6) and/or the self-lubricating lattice element 300. This is particularly advantageous, as heat buildup along these interfaces can increase wear and can cause the evaporation or burn off of lubricant and/or coolant materials, and by improving the ability of the seal assembly 200 to remove heat from the interface, the life cycle of the components such as the runner 202 and the sealing element 204 can be extended.

As shown in FIGS. 7A through 7C, the self-lubricating lattice element 300 can be elastically compressible. Specifically, a self-lubricating lattice element 300 with an initial thickness T1 as illustrated in FIG. 7A can be exposed to a compressive stress applied to one or both of the first end 304 and second end 306 of the self-lubricating lattice element 300. The compressive stress can cause the self-lubricating lattice element 300 to deform from the uncompressed state to a compressed configuration with a compressed thickness T2, as illustrated in FIG. 7B. When the compressive stress is removed or relieved from the self-lubricating lattice element 300, the self-lubricating lattice element 300 can expand elastically back to the uncompressed state with a thickness T1, as shown in FIG. 7C.

Figure 8A:
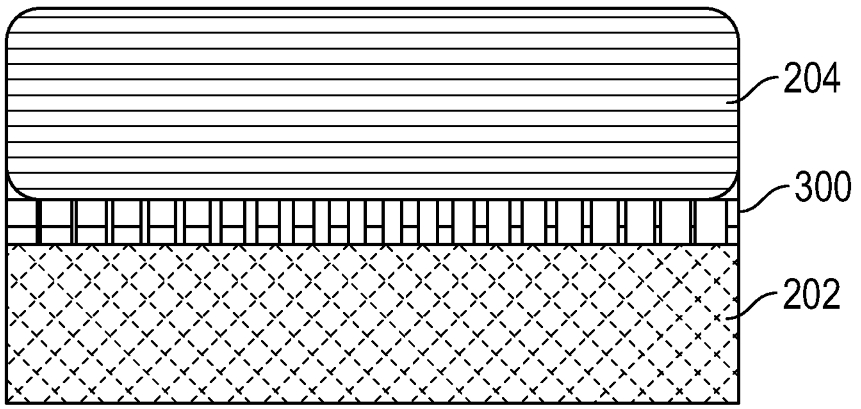
FIG. 8A illustrates a cross sectional view of a seal assembly including a self-lubricating pad when the associated turbomachine engine is in a resting condition.
Figure 8B:
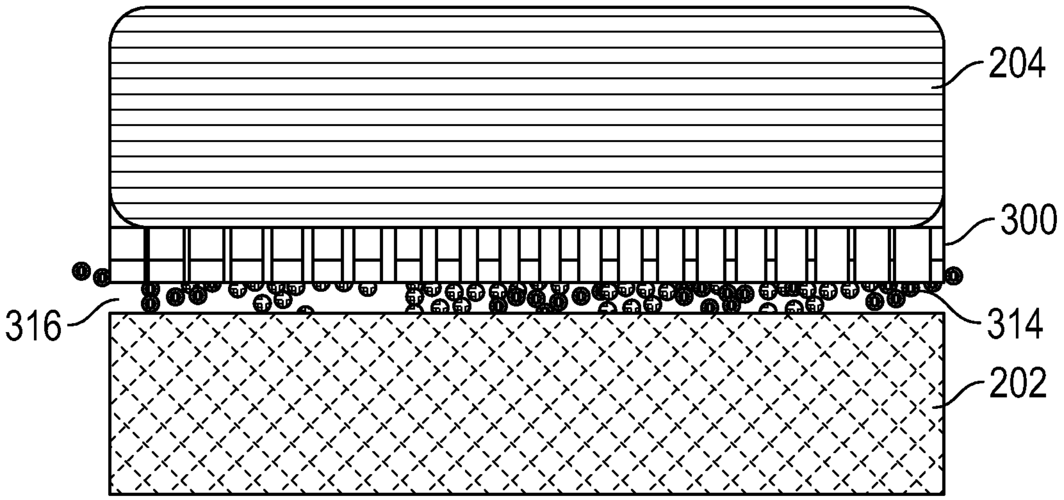
FIG. 8B illustrates a cross sectional view of the seal assembly of FIG. 8A when the associated turbomachine engine is in an operational condition.

The self-lubricating lattice element 300 can be used in contacting seal assemblies such as seal assembly 100 and seal assembly 200 previously described. In such examples, the self-lubricating lattice element 300 and the rotating components of the seal assembly, such as the runner 202, are in contact, as shown in FIG. 8A, when the engine is in an idle condition. When the engine is in an operational condition, the rotational movement of the shaft (that is, the rotating shaft 31 previously described) provides the compressive force to move the self-lubricating lattice element 300 from the uncompressed state to the compressed configuration, as illustrated in FIG. 8B. This causes the self-lubricating lattice element 300 to conform to the surface features of the runner 202 and causes the fluid (such as the cooling fluid or lubricant previously described) to be expelled from the pores 312 of the self-lubricating lattice element 300 creating a coolant and/or lubricant liquid film 314 between the self-lubricating lattice element 300 and the runner 202, as shown in FIG. 8B.

The coolant and/or lubricant liquid film 314 formed between the self-lubricating lattice element 300 and the runner 202 can provide additional lubrication between the self-lubricating lattice element 300 and the runner 202 during engine operation. The combined conformation of the self-lubricating lattice element 300 to the surface of the runner 202 and the formation of the coolant and/or lubricant liquid film 314 between the self-lubricating lattice element 300 and the runner 202 can reduce the coefficient of friction generated by the relative motion between the self-lubricating lattice element 300 and the runner 202 during engine operation. In turn, this can reduce the physical wear of the sealing element 204 and the runner 202 and can better dissipate heat generated from friction between the sealing element 204 and the runner 202.

Figure 8C:
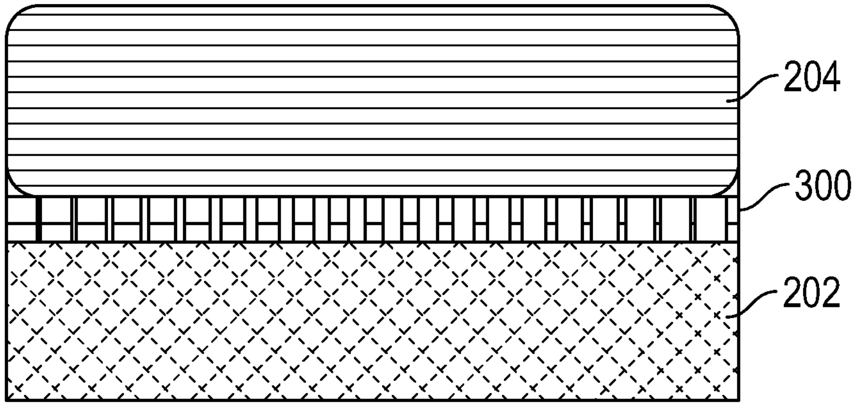
FIG. 8C illustrates a cross sectional view of the seal assembly of FIGS. 8A and 8B when the associated turbomachine engine has returned to a resting condition.

When the engine is shut off, or when engine speed decreases, the compressive forces on the self-lubricating lattice element 300 may also decrease, and the pad may return to an uncompressed state, as illustrated in FIG. 8C. This allows the pores 312 (FIG. 7D) to re-expand, and the coolant and/or lubricant forming the liquid film 314 can be taken back up into the self-lubricating lattice element 300, as illustrated in FIG. 8C.

The self-lubricating lattice element 300 can also be used in the non-contacting and/or hydrodynamic seal assemblies previously discussed. In such examples, the self-lubricating lattice element 300 is in contact with the runner 202 when the engine is in a resting or idle condition, as shown in FIG. 8A. When then engine is in an operational condition, the rotational movement of the shaft (that is, the rotating shaft 31 previously described) and the hydrodynamic grooves (for example, the hydrodynamic grooves 216 shown in FIG. 4.) creates an air film 316 between the runner 202 and the sealing element 204, as shown in FIG. 8B.

The air film 316 can, in some examples, comprise a layer of pressurized air ranging from 1 mil to 20 mils thick. In specific examples, the layer of pressurized air can have a thickness of 1, 2, 3, 4, 5, 6, 7, 8, 9, 10, 11, 12, 13, 14, 15, 16, 17, 18, 19, or 20 mils. In some examples, the thickness of the layer of pressurized air comprising the air film 316 may vary depending on the rotational velocity of the engine shaft (for example, the rotating shaft 31 previously described) and the runner 202. For instance, the air film 316 may have a lower thickness when the runner 202 is running at low rotational speeds and a higher thickness when the runner 202 is operating at high rotational speeds.

The air film 316 in turn compresses the self-lubricating lattice element 300 from the non-compressed configuration to the compressed configuration, as best shown in FIG. 8B. When the self-lubricating lattice element 300 is compressed by the air film 316, the pores 312 (FIG. 8D) can become compressed and the fluid contained in the pores 312, such as the lubricant and/or cooling fluid previously discussed, can be expelled from the pores 312. In such examples, the lubricant and/or cooling liquid can mix with the air film 316 and/or form a liquid lubricating layer distinct from the air film. In some specific examples, such as that illustrated in FIG. 8B, the lubricant and/or cooling liquid can mix with the air in the gap between the self-lubricating lattice element 300 and the runner 202 to form a layer of air and atomized lubricant and/or cooling liquid.

The fluid layer formed between the self-lubricating lattice element 300 and the runner 202 can provide additional lubrication between the self-lubricating lattice element 300 and the runner 202 during engine operation. The combined conformation of the self-lubricating lattice element 300 to the surface of the runner 202 and the formation of a fluid film comprising the air film 316 and the coolant and/or lubricant liquid film 314 between the self-lubricating lattice element 300 and the runner 202 can reduce the coefficient of friction generated by the relative motion between the self-lubricating lattice element 300 and the runner 202 during engine operation. In turn, this can reduce both physical wear of the sealing element 204 and the runner 202 heat generated from friction between the sealing element 204 and the runner 202.

When the engine is shut off, or when engine speed decreases, the air gap between the runner 202 and the sealing element 204 can reduce to a correspondingly lower thickness. When this occurs, the compressive forces on the self-lubricating lattice element 300 may also decrease and the pad may return to an uncompressed state, as illustrated in FIG. 8C. This allows the pores 312 to re-expand, and the coolant and/or lubricant forming the liquid film 314 can be taken back up into the self-lubricating lattice element 300, as illustrated in FIG. 8C.

It is to be appreciated that, while the use of self-lubricating lattice structures, such as the self-lubricating lattice elements 300 described above, has been discussed in the context of seals for the bearing compartment of a turbomachine engine, such self-lubricating lattice structures can also be used at a variety of interfaces having two components that move at high rotational velocities relative to one another when the engine is in an operational condition.

While the use of carbon, graphite, and graphene materials for the self-lubricating lattice element 300 has been described above, it is to be appreciated that other materials may be suitable for use in the self-lubricating lattice element 300 in lieu of these carbon-based materials. For example, the self-lubricating lattice element 300 may comprise a porous metallic structure and/or a metal foam. The porous metallic structure can be formed of many suitable materials, including a porous metal, such as, nickel, titanium, aluminum, steel and combinations thereof, as well as composite metallic materials. Generally, the porous metallic structure comprises a plurality of interconnected pores or voids. The pores or voids are capable of retaining a fluid, such as a lubricant or coolant, and can release a portion of the retained fluid when the engine is in an operational condition.

In examples using a porous metallic material for self-lubricating lattice element 300, an external source of lubricant, such as a lubricant feed from the sump housing 102, or a drip feed from a reservoir in communication with the interfacial layer 218 may be included to supply the interfacial layer 218 with a steady supply of a lubricant material. The external lubricant source can generally comprise a reservoir and one or more channels to deliver the lubricant to the self-lubricating lattice element 300.

It is to be appreciated that, in examples in which self-lubricating lattice element 300 comprises a porous metallic structure, the self-lubricating lattice element 300 may be formed in several suitable ways. For example, the self-lubricating lattice element 300 can be additively manufactured at a desirable location within the engine, such as turbomachine engine 10, by various methods including 3-dimensional printing, metal cold spraying, electrodeposition, or any other method suitable for forming porous metallic structures on already-existing components such as the runner 202 and/or the sealing element 204 of the seal assembly 200.

Figure 9:
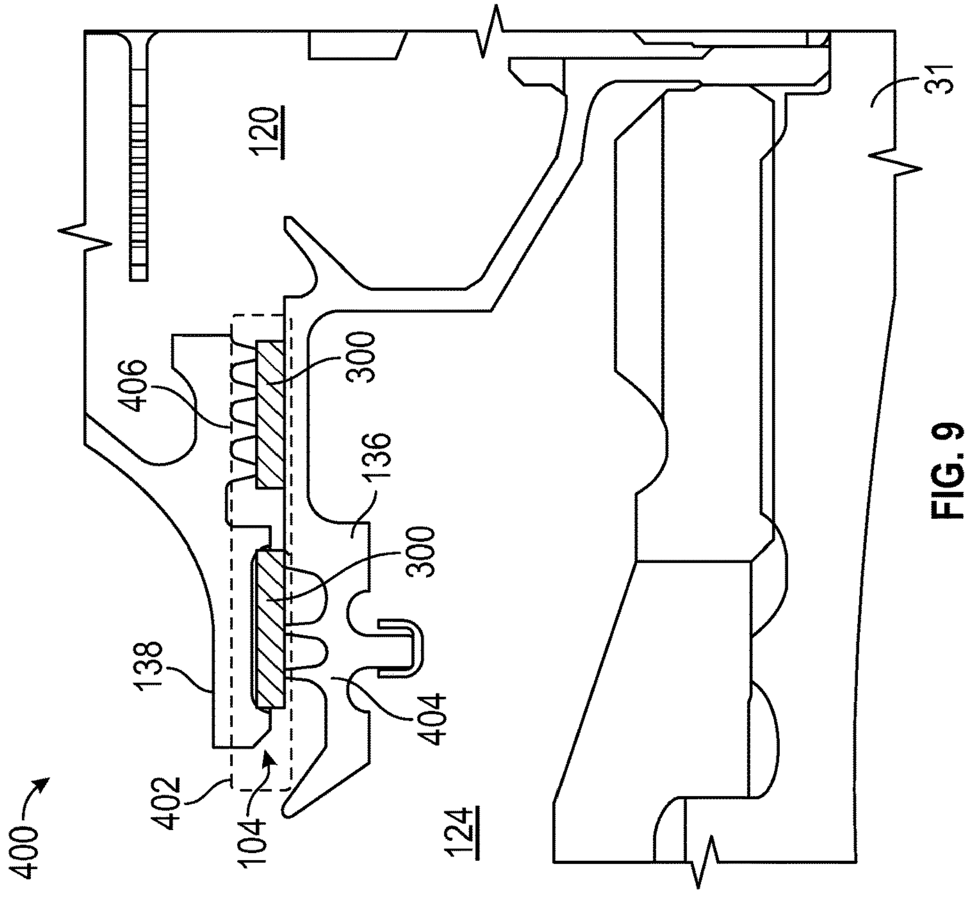
FIG. 9 illustrates a seal assembly with a labyrinth seal including self-lubricating pads according to one example.

FIG. 9 depicts a labyrinth seal assembly 400 which can include a labyrinth seal '104 and a self-lubricating lattice element 300. The labyrinth seal 104 may be substantially similar to the labyrinth seal 104 of the seal assembly 100 as previously described and illustrated in FIG. 2, and may function in substantially the same fashion, except as indicated below.

As shown in FIG. 9, the seal assembly 400 can comprise the labyrinth seal 104 with an inner surface 136 and an outer surface 138 forming an interface 402. The interface 402 between the inner surface 136 and the outer surface 138 can include multiple contacting elements, such as a first contacting element 404 and a second contacting element 406, which define a tortuous pathway between the pressurized compartment 124 and the bearing compartment 120. In some examples, such as that shown in FIG. 9, a first self-lubricating lattice element 300 can be positioned between the first contacting element 404 and the outer surface 138 and a second self-lubricating lattice element 300 can be positioned between the second contacting element

406 and the inner surface 136. While FIG. 9 shows a seal assembly 400 that includes two self-lubricating lattice elements 300 disposed along the interface 402, it is to be understood that in other examples, the seal assembly 400 may omit one of the first or the second carbon pads. In such examples, a single self-lubricating lattice element 300 may be positioned between the first contacting element 404 and the outer surface 138 or a single self-lubricating lattice element 300 positioned between the second contacting element 406 and the inner surface 136.

When the turbomachine engine including the seal assembly 400 is in operation, the inner surface 136 of the seal assembly 400 rotates along with rotating shaft 31. This causes the compression of the self-lubricating lattice elements 300 and the formation of the coolant and/or lubricant liquid film 314 as previously described above and illustrated in FIGS. 8A through 8C. In this way, the heat generated by the contact of the inner surface 136 and outer surface 138 along the interface 402 can be more readily dissipated and the wear between the components of the seal assembly 400 can be reduced.

Figure 10:
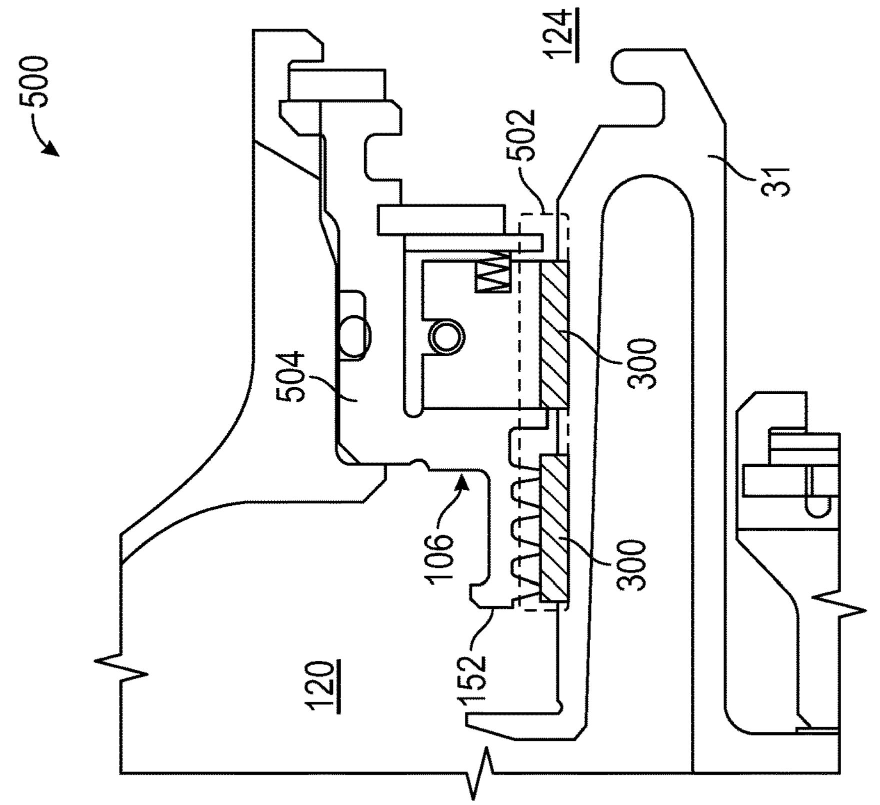
FIG. 10 illustrates a seal assembly with a radial carbon including self-lubricating pads according to another example.

FIG. 10 depicts a carbon seal assembly 500 which may include a carbon seal 106 and a self-lubricating lattice element 300. The carbon seal 106 may be substantially similar to the carbon seal 106 of the seal assembly 100 as previously described and illustrated in FIG. 3B, and may function in substantially the same fashion, except as indicated below.

As shown in FIG. 10, the seal assembly 500 can comprise a radial carbon seal 106 with an interface 502 between a carbon element 504 and the rotating shaft 31. The interface 502 separates the pressurized compartment 124 and the bearing compartment 120. In some examples, the seal assembly 500 can further comprise a grooved windback 152 to minimize the flow of lubricants and/or cooling fluids between the pressurized compartment 124 and the bearing compartment 120. A first self-lubricating lattice element 300 can be positioned between the carbon element 504 and the rotating shaft 31. A second self-lubricating lattice element 300 can also be positioned between the rotating shaft 31 and the windback 152. While FIG. 10 shows a seal assembly 500 that includes two self-lubricating lattice elements 300 disposed along the interface 502, it is to be understood that in other examples, the seal assembly 500 may omit one of the self-lubricating lattice elements 300 shown. In such examples, a single self-lubricating lattice element 300 may be positioned between the rotating shaft 31 and the carbon element 504 or a single self-lubricating lattice element 300 may be positioned between the rotating shaft 31 and the windback 152.

When the turbomachine engine including the seal assembly 500 is in operation, the inner face of the seal assembly 500 rotates along with rotating shaft 31. This causes the compression of the self-lubricating lattice elements 300 and the formation of the coolant and/or lubricant liquid film 314 as previously described above and illustrated in FIGS. 8A through 8C. In some examples, the self-lubricating lattice element 300 can be disposed on the rotating shaft 31, and the compression of the self-lubricating lattice element 300 can cause the formation of the coolant and/or lubricant liquid film 314 between the self-lubricating lattice element 300 and the carbon element 504, in a similar fashion to that described above and illustrated in FIGS. 8A through 8C. In other examples, the self-lubricating lattice element 300 can be disposed on the carbon element 504, and the compression of the self-lubricating lattice element can cause the formation of the coolant and/or lubricant liquid film 314 between the self-lubricating lattice element and the rotating shaft 31.

In those examples having a carbon seal between the rotating shaft 31 and the windback 152, the self-lubricating lattice element 300 may preferably be disposed along the rotating shaft 31 and configured to conform to the grooves of the windback 152 and/or to deform with the hydrodynamic effect. In such examples, the compression of the self-lubricating lattice element 300 during the operation of the turbomachine engine can cause the formation of a lubricant and/or coolant layer between the self-lubricating lattice element 300 and the windback 152, in the manner described above.

Figure 11:
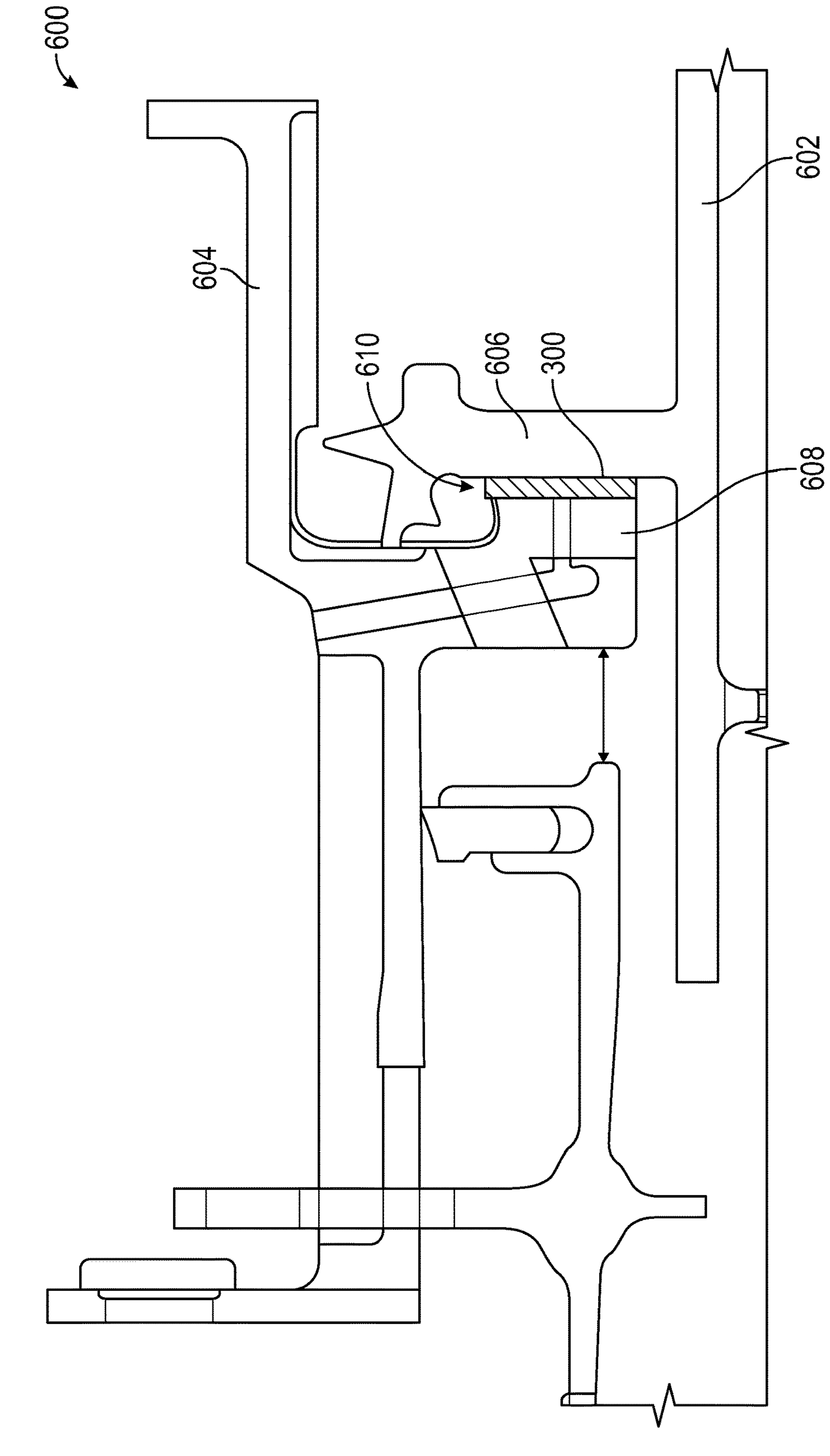
FIG. 11 illustrates a seal assembly with an aspirating face seal including self-lubricating pads according to another example.

FIG. 11 depicts an aspirating face seal assembly 600, which may include a carbon pad such as self-lubricating lattice element 300. The aspirating face seal assembly 600 can include a rotatable member 602 operably connected to a rotating turbomachine shaft, such as rotating shaft 31 of turbomachine engine 10 as described above. The aspirating face seal assembly 600 can also include a stationary member 604 that is stationary relative to a fixed housing of a turbomachine engine, such as fixed housing 39 of turbomachine engine 10 as described above. As shown in FIG. 11, the rotatable member 602 includes a runner 606 and the stationary member 604 includes a sealing element 608. A self-lubricating lattice element 300 is disposed between the runner 606 and the sealing element 608 to form a sealing interface 610.

In some examples, the aspirating face seal assembly 600 may be configured as a contact seal, as shown in FIG. 11. In some of these examples, the self-lubricating lattice element 300 can be disposed on the sealing element 608 and may be in rotating physical contact with the runner 606 when the turbomachine engine including aspirating face seal assembly 600 is in the operational condition. It is to be understood, however, that in other examples in which the aspirating face seal assembly 600 is a contact seal, the self-lubricating lattice element 300 can be disposed on the runner 606 and in rotating physical contact with the sealing element 608 when the turbomachine engine including seal assembly 600 is in operational condition. The rotating physical contact against the self-lubricating lattice element 300 can impose a compressive force on the self-lubricating lattice element 300, and the formation of the coolant and/or lubricant liquid film 314 between the rotating and stationary parts of the seal assembly 600, as described above.

In other examples, the aspirating face seal assembly 600 may be configured as a non-contact seal, such as those described above. In such examples, either the runner 606 or the sealing element 608 may include one or more hydrodynamic features or grooves, such as those described above. In some of these examples, the self-lubricating lattice element 300 can be disposed on the sealing element 608 and the relative rotational motion between the runner 606 and the sealing element 608 can form an air film between the runner 606 and the self-lubricating lattice element 300. It is to be understood that in other examples, however, the self-lubricating lattice element 300 can be disposed on the runner 606, and the relative rotational motion between the runner 606 and the sealing element 608 can form an air film between the sealing element 608 and the self-lubricating lattice element 300. The formation of the air film can also cause the compression of the self-lubricating lattice element 300 and the formation of a mixed air and coolant and/or lubricant liquid film 314 between the rotating and stationary parts of the aspirating face seal assembly 600, in the manner described above.

Figure 12:
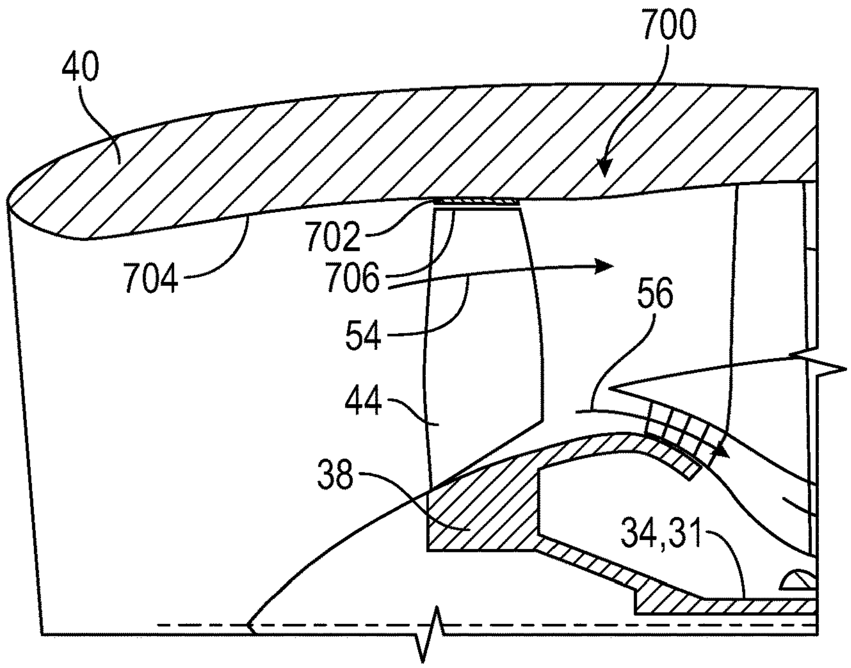
FIG. 12 illustrates a fan section of a turbomachine engine including self-lubricating pads according to one example.

The self-lubricating lattice materials described above may also be used as wear sleeves and/or wear pads at in other locations within the turbomachine engine 10. For example, FIG. 12 illustrates a wear sleeve assembly 700 disposed between the fan blades 44 and the fan casing 40, of a turbomachine engine, such as turbomachine engine 10 described above. The wear sleeve assembly 700 can comprise a self-lubricating lattice element 702 disposed along an interior surface 704 of the fan casing 40, forming a gap 706 between the fan blades 44 and the self-lubricating lattice element 702.

The self-lubricating lattice element 702 can have a porous structure that can retain a fluid such as a lubricant and/or coolant. The self-lubricating lattice element 702 can also be elastically compressible by the motion of the fan blades 44 relative to the engine casing 40 of the turbomachine engine 10 when the turbomachine engine 10 is in an operational condition. This compression can expel or partially expel the fluid or a portion of the fluid when the turbomachine engine is in an operational condition. The lubricant and/or coolant, when expelled, can form a fluid layer between the fan blades 44 of the turbomachine engine 10 and the self-lubricating lattice element 702, within the gap 706 defined by the self-lubricating lattice element 702 and the fan blades 44. Thus, the addition of the self-lubricating lattice element 702 can reduce heat generation and wear and can protect the fan blades 44 from accidental contact against the interior of the fan casing 40 as the fan blades 44 rotate along with the rotating shaft 31 when the engine is in an operational condition. This may reduce the wear and improve the life cycle of the fan blades 44 and the interior of the fan casing 40.

Figure 13:
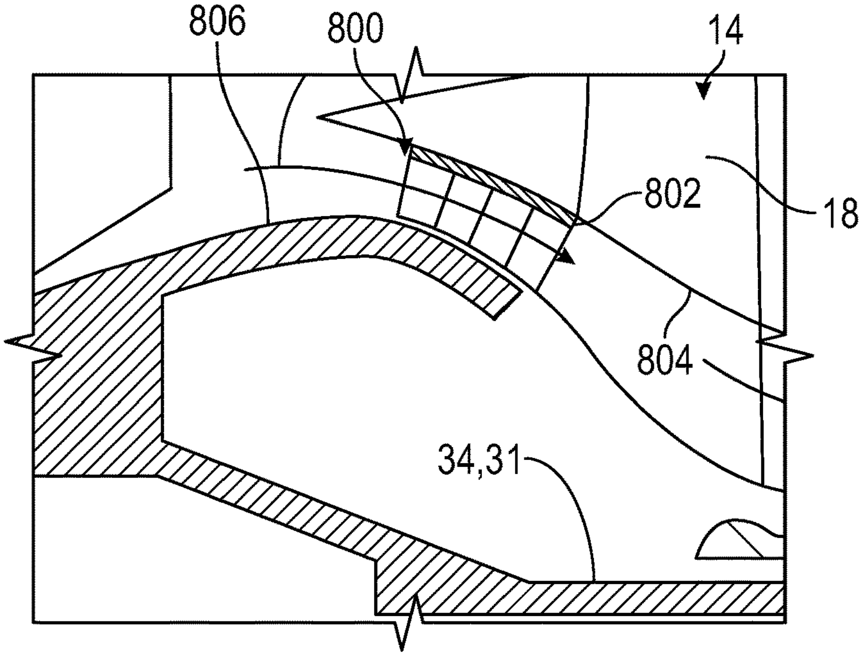
FIG. 13 illustrates a compressor section of a turbomachine engine including self-lubricating pads according to one example.

In another example, a wear sleeve assembly can be positioned within a compressor assembly, such as compressor 22 of turbomachine engine. As illustrated in FIG. 13, a wear sleeve assembly 800 can comprise a self-lubricating lattice element 802 disposed between the rotating shaft 31 and the external housing 18 of the core engine 14 of turbomachine engine within the compressor 22 (FIG. 1). In some examples, such as that illustrated in FIG. 13, the self-lubricating lattice element 802 can be disposed along an inner surface 804 of the external housing 18 of the core engine 14 (FIG. 1). In an alternate embodiment, the self-lubricating lattice element 802 can also be disposed along an external surface 806 of the rotating shaft 31.

The self-lubricating lattice element 802 can have a porous structure that can retain a fluid such as a lubricant and/or coolant. The self-lubricating lattice element 802 can also be elastically compressible by the motion of the rotating shaft 31 relative to the external housing 18 of the core engine 14 when the turbomachine engine 10 is in an operational condition. This compression can expel or partially expel the fluid or a portion of the fluid when the turbomachine engine 10 is in an operational condition. The lubricant and/or coolant, when expelled, can form a fluid layer between the rotating shaft 31 of the turbomachine engine 10 and the self-lubricating lattice element 802, or between the self-lubricating lattice element 802 and the inner surface 804 of the external housing 18 of the core engine 14. Thus, the addition of the self-lubricating lattice element 802 can reduce heat generation and wear and can protect the components of the compressor 22 from accidental contact against the fixed portions of the engine housing, such as external housing 18. This may reduce the wear and improve the life cycle of the compressor section of the turbomachine engine 10.

In alternate embodiment, any of the self-lubricating elements previously described can be used alone or in combination with one another. That is, a self-lubricating seal may be used with any number of wear sleeve assemblies positioned at the fan blades and/or compressors of the turbomachine engine, or any of these components may be used alone.

The various seal assemblies and compressible carbon microstructure lattice elements previously described can each serve to improve heat transfer away from seal interfaces, reduce friction along the seal interfaces, and reduce wear of the sealing components during operation of the turbofan engines. It will be readily appreciated that these seal assemblies and carbon microstructure lattice elements may be used individually or in combination with one another.

In view of the many possible embodiments to which the principles of the disclosed embodiments may be applied, it should be recognized that the illustrated embodiments are only preferred examples of the embodiments and should not be taken as limiting the scope of the embodiments. Rather, the scope of the embodiments are defined by the following claims.

Further aspects of the disclosure are provided by the subject matter of the following clauses:

A turbomachine comprising a rotating shaft extending along a centerline and a fixed housing positioned exterior to the rotating shaft in a radial direction relative to the centerline; and a seal assembly comprising a runner statically coupled to the rotating shaft, a sealing element statically coupled to the fixed housing, and a self-lubricating lattice element disposed between the runner and the sealing element; wherein the runner rotates with the rotating shaft and relative to the sealing element when the turbomachine is in an operational condition, and wherein the self-lubricating lattice element has a porous structure.

The turbomachine of the preceding clause wherein the self-lubricating lattice element is coupled to the sealing element and the runner rotates relative to the self-lubricating lattice element when the turbomachine is in an operational condition.

The turbomachine of any preceding clause wherein the self-lubricating lattice element is coupled to the runner and the self-lubricating lattice element rotates relative to the sealing element when the turbomachine is in an operational condition.

The turbomachine of any preceding clause wherein the self-lubricating lattice element is a first self-lubricating lattice element, and the seal assembly further comprises a second self-lubricating lattice element, and wherein the first self-lubricating lattice element is coupled to the sealing element and the second self-lubricating lattice element is coupled to the runner.

The turbomachine of any preceding clause wherein the self-lubricating lattice element is a compressible self-lubricating lattice element capable of elastically deforming between a non-compressed state when the turbomachine is not in an operational condition and a compressed state when the turbomachine is in the operational condition.

The turbomachine of any preceding clause wherein the porous structure of the compressible self-lubricating lattice element contains a fluid when the compressible self-lubricating lattice element is in the non-compressed state and at least a portion of the fluid is expelled from the porous structure of the compressible self-lubricating lattice element when the compressible self-lubricating lattice element deforms to the compressed state.

The turbomachine of any preceding clause wherein the fluid forms a fluid layer between the compressible self-lubricating lattice element and the sealing element when the compressible self-lubricating lattice element is in the compressed state.

The turbomachine of any preceding clause wherein the fluid forms a fluid layer between the compressible self-lubricating lattice element and the sealing element when the compressible self-lubricating lattice element is in the compressed configuration.

The turbomachine of any preceding clause wherein the fluid is a lubricant or a coolant.

The turbomachine of any preceding clause wherein the self-lubricating lattice element comprises graphite, graphene, carbon, or a combination thereof.

The turbomachine of any preceding clause wherein the self-lubricating lattice element comprises a porous metal selected from nickel, titanium, aluminum, steel, alloys thereof, and metal composites thereof.

The turbomachine of any preceding clause wherein the seal assembly further comprises a lubricant source.

The turbomachine of any preceding clause wherein the lubricant source comprises a lubricant reservoir and a channel extending from the lubricant reservoir to the self-lubricating lattice element.

The turbomachine of any preceding clause wherein the sealing element is formed as a separate component and one of the runner or the sealing element comprises a slot that receives the self-lubricating lattice element.

The turbomachine of any preceding clause wherein the seal assembly is a contacting seal assembly, wherein the self-lubricating lattice element is in contact with the runner and the sealing element while the turbomachine engine is in an operational condition.

The turbomachine of any preceding clause wherein the seal assembly is a non-contacting seal assembly comprising one or more hydrodynamic grooves disposed on the runner, wherein the self-lubricating lattice element is disposed on the sealing element, and an air film is formed between the self-lubricating lattice element and the runner when the turbomachine engine is in an operational condition.

The turbomachine of any preceding clause wherein the seal assembly is a non-contacting seal assembly comprising one or more hydrodynamic grooves disposed on the sealing element, wherein the self-lubricating lattice element is disposed on the runner, and an air film is formed between the self-lubricating lattice element and the sealing element when the turbomachine engine is in an operational condition.

A seal assembly for a turbomachine, the turbomachine including a rotating shaft extending along a centerline axis and a fixed housing positioned exterior to the rotating shaft in a radial direction relative to the centerline axis, the seal assembly comprising a runner fixedly coupled to the rotating shaft, a sealing element fixedly coupled to the fixed housing, and a compressible self-lubricating lattice element comprising a porous structure coupled to the runner and disposed between the runner and the sealing element; wherein the runner rotates along with the rotating shaft and relative to the sealing element when the turbomachine is in an operational condition, wherein one of the runner or the sealing element comprises one or more hydrodynamic grooves configured to form an air gap between the runner and the sealing element when the turbomachine is in the operational condition, and wherein a pressure in the air gap between the sealing element and the compressible self-lubricating lattice element compresses the compressible self-lubricating lattice element from a non-compressed state to a compressed state.

The seal assembly of any preceding clause wherein when the turbomachine is not in an operational condition, the compressible self-lubricating lattice element is in contact with the runner.

The seal assembly of any preceding clause wherein the porous structure of the compressible self-lubricating lattice element contains a liquid when the compressible self-lubricating lattice element is in the non-compressed state and at least partially expels the liquid to form a mixed film comprising the liquid and air disposed between the compressible self-lubricating lattice element and the runner. The seal assembly of any preceding clause wherein the liquid is a coolant or lubricant.

The seal assembly of any preceding clause wherein the compressible self-lubricating lattice element comprises porous graphite or graphene.

The seal assembly of any preceding clause wherein the self-lubricating element forms an interfacial layer between the runner and the sealing element.

The seal assembly of any preceding clause wherein the seal assembly is included in a sump seal of a turbomachine engine.

The seal assembly of any preceding clause wherein the seal assembly is included in a labyrinth seal of a turbomachine engine.

The seal assembly of any preceding clause wherein the seal assembly is included in an aspirating face seal of a turbomachine engine.

The seal assembly of any preceding clause wherein the seal assembly further comprises a windback configured to reduce the flow of lubricant between the runner and the sealing element.

A wear sleeve for a turbomachine, the turbomachine including a rotating shaft extending along a centerline axis and a fixed housing positioned exterior to the rotating shaft in a radial direction relative to the centerline axis, the wear sleeve comprising a self-lubricating lattice element disposed between the rotating shaft and the fixed housing of the turbomachine; and wherein the self-lubricating lattice element comprises a porous structure and is configured to retain a fluid when the turbomachine is in an idle state and to release a portion of the fluid when the turbomachine is in an operational condition.

The wear sleeve of any preceding clause wherein the fluid is a coolant or a lubricant.

The wear sleeve of any preceding clause wherein the turbomachine comprises a plurality of fan blades affixed to the rotating shaft and the self-lubricating element is positioned radially outwards from the fan blades and radially inwards from the fixed housing.

The wear sleeve of any preceding clause wherein the turbomachine comprises a core engine having a compressor section disposed within a core engine housing that surrounds the rotating shaft, and wherein the self-lubricating element is disposed in the compressor section between the rotating shaft and the core engine housing.

A seal assembly for a turbomachine, the turbomachine including a rotating shaft extending along a centerline and a fixed housing positioned exterior to the rotating shaft in a radial direction relative to the centerline, the seal assembly comprising a runner fixedly coupled to the rotating shaft; a sealing element fixedly coupled to the fixed housing; and a self-lubricating lattice element disposed between the runner and the sealing element, wherein the runner rotates with the rotating shaft and relative to the sealing element when the turbomachine is in an operational condition; and wherein the self-lubricating lattice element has a porous structure is in contact with the runner and the sealing element when the turbomachine is in an operational condition.

The invention claimed is:

1. A turbomachine comprising, a rotating shaft extending along a centerline and a fixed housing positioned exterior to the rotating shaft in a radial direction relative to the centerline; and a seal assembly comprising a runner statically coupled to the rotating shaft, a sealing element statically coupled to the fixed housing, and a self-lubricating lattice element disposed between the runner and the sealing element;

wherein the runner rotates with the rotating shaft and relative to the sealing element when the turbomachine is in an operational condition, and wherein the self-lubricating lattice element has a porous structure.

2. The turbomachine of claim 1, wherein the self-lubricating lattice element is coupled to the sealing element and the runner rotates relative to the self-lubricating lattice element when the turbomachine is in the operational condition.

3. The turbomachine of claim 1, wherein the self-lubricating lattice element is coupled to the runner and the self-lubricating lattice element rotates relative to the sealing element when the turbomachine is in the operational condition.

4. The turbomachine of claim 1, wherein the self-lubricating lattice element is a first self-lubricating lattice element, and the seal assembly further comprises a second self-lubricating lattice element, and wherein the first self-lubricating lattice element is coupled to the sealing element and the second self-lubricating lattice element is coupled to the runner.

5. The turbomachine of claim 1, wherein the self-lubricating lattice element is a compressible self-lubricating lattice element capable of elastically deforming between a non-compressed state when the turbomachine is not in an operational condition and a compressed state when the turbomachine is in the operational condition.

6. The turbomachine of claim 5, wherein the porous structure of the compressible self-lubricating lattice element contains a fluid when the compressible self-lubricating lattice element is in the non-compressed state and at least a portion of the fluid is expelled from the porous structure of the compressible self-lubricating lattice element when the compressible self-lubricating lattice element deforms to the compressed state.

7. The turbomachine of claim 6 wherein the fluid forms a fluid layer between the compressible self-lubricating lattice element and the runner when the compressible self-lubricating lattice element is in the compressed state.

8. The turbomachine of claim 6, wherein the fluid forms a fluid layer between the compressible self-lubricating lattice element and the sealing element when the compressible self-lubricating lattice element is in the compressed state.

9. The turbomachine of claim 6, wherein the fluid is a lubricant or a coolant.

10. The turbomachine of claim 1, wherein the self-lubricating lattice element comprises graphite, graphene, carbon, or a combination thereof.

11. The turbomachine of claim 1, wherein the self-lubricating lattice element comprises a porous metal selected from nickel, titanium, aluminum, steel, alloys thereof, and metal composites thereof.

12. The turbomachine of claim 1, wherein the sealing element is disposed on a detachable insert and one of the runner or the sealing element comprises a slot that receives the detachable insert.

13. A seal assembly for a turbomachine, the turbomachine including a rotating shaft extending along a centerline axis and a fixed housing positioned exterior to the rotating shaft in a radial direction relative to the centerline axis, the seal assembly comprising:

a runner fixedly coupled to the rotating shaft;

a sealing element fixedly coupled to the fixed housing; and a compressible self-lubricating lattice element comprising a porous structure coupled to the runner and disposed between the runner and the sealing element, wherein the runner rotates along with the rotating shaft and relative to the sealing element when the turbomachine is in an operational condition, wherein one of the runner or the sealing element comprises one or more hydrodynamic grooves configured to form an air gap between the runner and the sealing element when the turbomachine is in the operational condition, and wherein a pressure in the air gap between the sealing element and the compressible self-lubricating lattice element compresses the compressible self-lubricating lattice element from a non-compressed state to a compressed state.

14. The seal assembly of claim 13, wherein when the turbomachine is not in the operational condition, the compressible self-lubricating lattice element is in contact with the runner.

15. The seal assembly of claim 13, wherein the porous structure of the compressible self-lubricating lattice element contains a liquid when the compressible self-lubricating lattice element is in the non-compressed state and at least partially expels the liquid to form a mixed film comprising the liquid and air disposed between the compressible self-lubricating lattice element and the runner.

16. The seal assembly of claim 15, wherein the liquid is a coolant or lubricant.

17. The seal assembly of claim 13, wherein the compressible self-lubricating lattice element comprises porous graphite or graphene.

18. A wear sleeve for a turbomachine, the turbomachine including a rotating shaft extending along a centerline axis and a fixed housing positioned exterior to the rotating shaft in a radial direction relative to the centerline axis, the wear sleeve comprising a self-lubricating lattice element disposed between the rotating shaft and the fixed housing of the turbomachine; and wherein the self-lubricating lattice element comprises a porous structure and is configured to retain a fluid when the turbomachine is in an idle condition and to release a portion of the fluid when the turbomachine is in an operational condition.

19. The wear sleeve of claim 18, wherein the turbomachine comprises a plurality of fan blades affixed to the rotating shaft and the self-lubricating lattice element is positioned radially outwards from the fan blades and radially inwards from the fixed housing.

20. The wear sleeve of claim 18, wherein the turbomachine comprises a core engine having a compressor section disposed within a core engine housing that surrounds the rotating shaft, and wherein the self-lubricating lattice element is disposed in the compressor section between the rotating shaft and the core engine housing.

* * * * *